US012451581B2

(12) United States Patent
Tokuda et al.

(10) Patent No.: US 12,451,581 B2
(45) Date of Patent: Oct. 21, 2025

(54) DIRECTIONAL COUPLER HAVING A MAIN LINE AND SUB-LINES, WHERE A SWITCHING CIRCUIT IS CONNECTED IN PARALLEL TO A SUB-LINE TO PROVIDE A SHORTED STATE OR AN OPEN STATE

(71) Applicant: Murata Manufacturing Co., Ltd., Kyoto (JP)

(72) Inventors: Daisuke Tokuda, Kyoto (JP); Ryangsu Kim, Kyoto (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 277 days.

(21) Appl. No.: 18/168,644

(22) Filed: Feb. 14, 2023

(65) Prior Publication Data

US 2023/0208004 A1    Jun. 29, 2023

Related U.S. Application Data

(63) Continuation of application No. PCT/JP2021/033025, filed on Sep. 8, 2021.

(30) Foreign Application Priority Data

Sep. 14, 2020   (JP) ................. 2020-153794

(51) Int. Cl.
*H01P 5/18* (2006.01)
*H01P 1/10* (2006.01)

(52) U.S. Cl.
CPC . *H01P 5/18* (2013.01); *H01P 1/10* (2013.01)

(58) Field of Classification Search
CPC ....................................................... H01P 5/18

USPC .......................................................... 333/111
See application file for complete search history.

(56) References Cited

U.S. PATENT DOCUMENTS

| 10,498,004 | B1 | 12/2019 | Ji et al. | |
| 11,509,034 | B2* | 11/2022 | Seki et al. | H04B 1/04 |
| 2010/0171564 | A1* | 7/2010 | Yamamoto et al. | H01P 5/18 |
| | | | | 333/116 |
| 2017/0317396 | A1 | 11/2017 | Srirattana et al. | |
| 2018/0062236 | A1 | 3/2018 | Okamoto | |
| 2019/0348961 | A1* | 11/2019 | Lim et al. | H03H 7/18 |
| 2020/0119424 | A1* | 4/2020 | Lim et al. | H01P 5/18 |

FOREIGN PATENT DOCUMENTS

| CN | 112310590 A | 2/2021 |
| JP | 2002-280811 A | 9/2002 |
| WO | 2017/013927 A1 | 1/2017 |

OTHER PUBLICATIONS

International Search Report for PCT/JP2021/033025 dated Nov. 9, 2021.

* cited by examiner

*Primary Examiner* — Benny T Lee
(74) *Attorney, Agent, or Firm* — McDonald Hopkins LLC

(57) ABSTRACT

A directional coupler includes a main line, sub-lines, and a switch. The sub-lines are located at positions that enable the sub-lines to be electromagnetically coupled to the main line. The switch is coupled between an end portion sand an end portion of the sub-line. The switch is configured to switch connection of the end portion and the end portion between a shorted state and an open state.

12 Claims, 31 Drawing Sheets

DIRECTIONAL COUPLER HAVING A MAIN LINE AND SUB-LINES, WHERE A SWITCHING CIRCUIT IS CONNECTED IN PARALLEL TO A SUB-LINE TO PROVIDE A SHORTED STATE OR AN OPEN STATE

CROSS REFERENCE TO RELATED APPLICATION

This is a continuation of International Application No. PCT/JP2021/033025 filed on Sep. 8, 2021 which claims priority from Japanese Patent Application No. 2020-153794 filed on Sep. 14, 2020. The contents of these applications are incorporated herein by reference in their entireties.

BACKGROUND ART

Technical Field

The present invention relates to a directional coupler having a main line and a plurality of sub-lines.

Patent Document 1 describes a directional coupler having a main line and a plurality of coupled lines. The plurality of coupled lines include a first coupled line and a second coupled line that are positioned such that the first coupled line and the second coupled line are coupled to the main line via electromagnetic fields.

The directional coupler described in Patent Document 1 includes a coupling output terminal, a termination resistance, and a switching circuit. The switching circuit switches between the first coupled line and the second coupled line and couple one of the first coupled line and the second coupled line to a coupling output terminal and a termination resistance.

Patent Document 1: U.S. Pat. No. 10,498,004

BRIEF SUMMARY

With the configuration using a plurality of coupled lines (sub-lines) as described in Patent Document 1, the coupling capacitance between the main line and the sub-lines can degrade the transfer characteristic of radio-frequency signals communicated through the main line.

An object of the present invention is to suppress degradation of the transfer characteristic of radio-frequency signals communicated through a main line in a directional coupler having a plurality of sub-lines.

A directional coupler according to an aspect of the present invention includes a main line, a first sub-line, a second sub-line, and a first switching circuit. The first sub-line and the second sub-line are located at positions that enable the first sub-line and the second sub-line to be electromagnetically coupled to the main line. The first switching circuit is coupled between a first end and a second end of the first sub-line. The first switching circuit is configured to switch connection of the first end and the second end between a shorted state and an open state.

With this configuration, by bringing the first end and the second end of the first sub-line in the open state, the first sub-line can be used to obtain detected signals corresponding to radio-frequency signals communicated through the main line. By bringing the first end and the second end of the first sub-line in the shorted state, the coupling capacitance to the main line can be changed. As such, the attenuation pole in the transfer characteristic of the main line can be controlled, thereby suppressing degradation of the transfer characteristic of the main line.

According to the present invention, a directional coupler can suppress degradation of the transfer characteristic of radio-frequency signals communicated along the main line.

DETAILED DESCRIPTION

Summary of Present Invention

Figure 1:
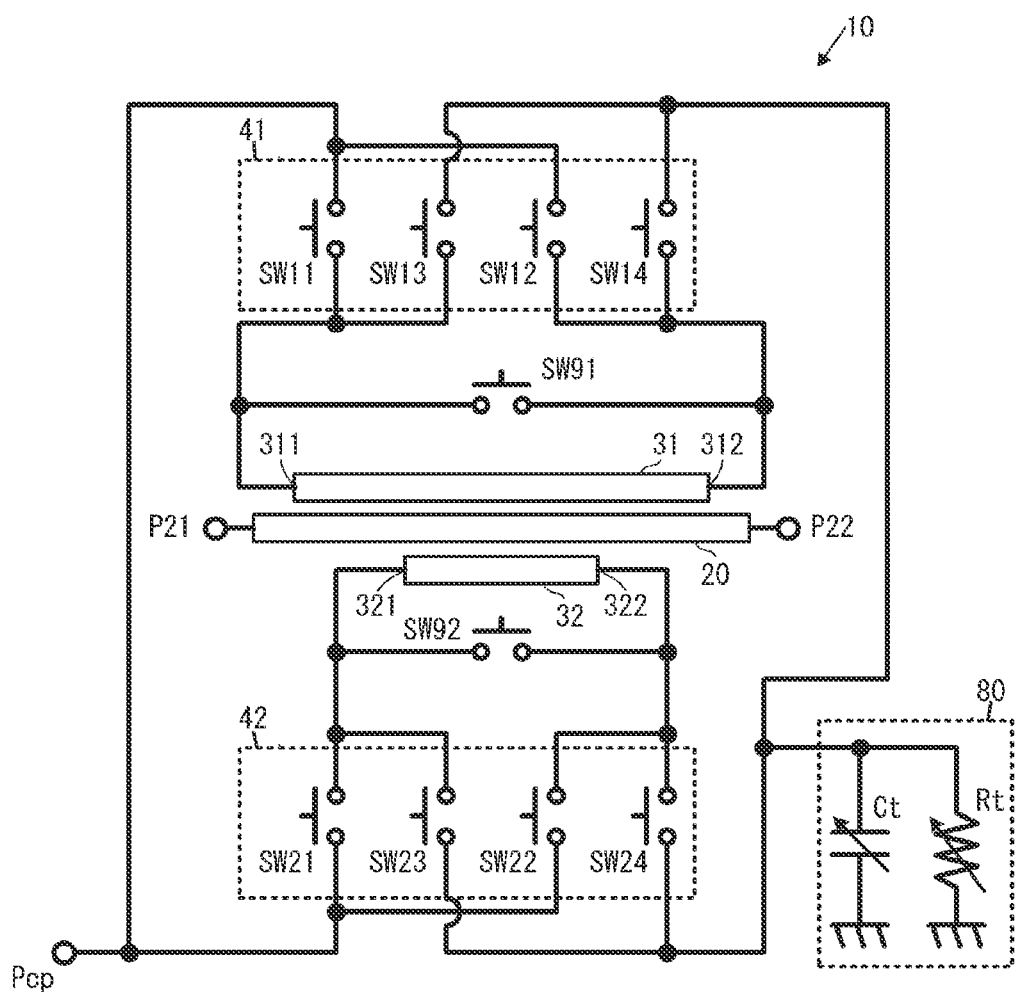
FIG. 1 is a configuration diagram of a directional coupler according to a first embodiment.

Hereinafter, a summary of the present invention will be described.

A directional coupler according to an aspect of the present invention includes a main line, a first sub-line and a second sub-line located at positions that enable the first sub-line and the second sub-line to be electromagnetically coupled to the main line, and a first switching circuit coupled between a first end and a second end of the first sub-line and configured to switch connection of the first end and the second end between a shorted state and an open state.

With this configuration, when the first end and the second end of the first sub-line are brought in the open state, the first sub-line can be used to obtain detected signals corresponding to radio-frequency signals communicated through the main line. When the first end and the second end of the first sub-line are brought in the shorted state, the coupling capacitance to the main line can be changed. As such, the attenuation pole in the transfer characteristic of the main line can be controlled, thereby suppressing degradation of the transfer characteristic of the main line.

For example, the directional coupler according to an aspect of the present invention may further include a coupling terminal and a termination circuit that are coupled to the first sub-line and the second sub-line, and a second switching circuit coupled between the first sub-line and the second sub-line, and the coupling terminal and the termination circuit.

With this configuration, a detected current communicated through the first sub-line or the second sub-line in any direction can be outputted from the coupling terminal. As a result, it is possible to reduce transfer loss of the main line, while constantly reaching a desired value or greater with respect to the degree of coupling over a wide frequency band.

For example, in the directional coupler according to an aspect of the present invention, the second switching circuit may be configured to switch the first sub-line and the second sub-line to couple one of the first sub-line and the second sub-line to the coupling terminal and the termination circuit.

This configuration can inhibit adverse effects such as power leakage, and as a result, desired characteristics are easily achieved.

For example, in the directional coupler according to an aspect of the present invention, the first switching circuit may be configured to, when the second switching circuit couples the second sub-line to the coupling terminal and the termination circuit, bring the first end and the second end of the first sub-line in the shorted state.

This configuration can inhibit adverse effects such as power leakage to the termination circuit and the coupling terminal, and as a result, desired characteristics are easily achieved.

For example, in the directional coupler according to an aspect of the present invention, the first switching circuit may be configured to, when the second switching circuit couples the first sub-line to the coupling terminal and the termination circuit, bring the first end and the second end of the first sub-line in the open state.

With this configuration, a detected current communicated through the first sub-line is outputted from the coupling terminal.

For example, in the directional coupler according to an aspect of the present invention, the second switching circuit may have a first connection mode in which the first end is coupled to the coupling terminal, and the second end is coupled to the termination circuit, and a second connection mode in which the second end is coupled to the termination circuit, and the first end is coupled to the coupling terminal; and the second switching circuit may be configured to switch between the first connection mode and the second connection mode.

With this configuration, a detected current communicated through the first sub-line in any direction can be outputted from the coupling terminal.

For example, in the directional coupler according to an aspect of the present invention, the second switching circuit may have a third connection mode in which the first end and the second end are coupled to each other; the second switching circuit may be configured to switch among the first connection mode, the second connection mode, and the third connection mode; and the shorted state of the first switching circuit may be achieved in the third connection mode.

With this configuration, either of a detected current communicated through the first sub-line and or a detected current communicated through the second sub-line can be outputted from the coupling terminal by changing the connection mode.

For example, in the directional coupler according to an aspect of the present invention, the second switching circuit may include a first switch coupled between the first end and the coupling terminal, a second switch coupled between the second end and the coupling terminal, a third switch coupled between the first end and the termination circuit, and a fourth switch coupled between the second end and the termination circuit; the first switching circuit may be formed by a combination of the first switch and the second switch or a combination of the third switch and the fourth switch.

This configuration eliminates switches for controlling the shorted state of both ends of a corresponding sub-line not used for detection, thereby reducing the circuit size. Furthermore, the number of switches coupled to sub-lines but not used directly to switch outputs of detected signals is decreased. As a result, the degree of coupling in a desired frequency band is increased, and the effect of reducing transfer loss of the main line is improved.

For example, in the directional coupler according to an aspect of the present invention, the first switching circuit may be formed by a combination of the first switch and the second switch.

This configuration eliminates switches for controlling the shorted state of both ends of a corresponding sub-line not used for detection, thereby reducing the circuit size. Furthermore, the number of switches coupled to sub-lines but not used directly to switch outputs of detected signals is decreased. As a result, the degree of coupling in a desired frequency band is increased, and the effect of reducing transfer loss of the main line is improved.

For example, in the directional coupler according to an aspect of the present invention, the second switching circuit may include a fifth switch configured to switch connection of the first switch and the second switch, and the coupling terminal between the shorted state and the open state.

This configuration can inhibit adverse effects such as power leakage to the coupling terminal and adverse effects caused by other circuits coupled to the coupling terminal, and as a result, desired characteristics are easily achieved.

For example, in the directional coupler according to an aspect of the present invention, the fifth switch may be configured to, when the third connection mode is achieved by the first switch and the second switch, switch connection of the first switch and the second switch, and the coupling terminal, to the open state.

With this configuration, the sub-line with ends shorted is not coupled to the coupling terminal, and thus, impedance matching between the sub-line outputting a detected signal and the coupling terminal is more effectively provided.

For example, in the directional coupler according to an aspect of the present invention, the fifth switch may be configured to, when the first connection mode is achieved by the first switch and the fourth switch, switch connection of the first switch and the coupling terminal to the shorted state.

With this configuration, a detected current communicated through the first sub-line is outputted from the coupling terminal.

For example, in the directional coupler according to an aspect of the present invention, the first switching circuit may be formed by a combination of the third switch and the fourth switch.

This configuration eliminates switches for controlling the shorted state of both ends of a corresponding sub-line not used for detection, thereby reducing the circuit size. Furthermore, the number of switches coupled to sub-lines but not used directly to switch outputs of detected signals is decreased. As a result, the degree of coupling in a desired frequency band is increased, and the effect of reducing transfer loss of the main line is improved.

For example, in the directional coupler according to an aspect of the present invention, the second switching circuit may include a sixth switch configured to switch connection of the third switch and the fourth switch, and the termination circuit, between the shorted state and the open state.

This configuration can inhibit adverse effects such as power leakage to the coupling terminal and adverse effects caused by other circuits coupled to the coupling terminal, and as a result, desired characteristics are easily achieved.

For example, in the directional coupler according to an aspect of the present invention, the sixth switch may be configured to, when the third connection mode is achieved by the third switch and the fourth switch, switch connection of the third switch and the fourth switch, and the coupling terminal, to the open state.

With this configuration, the sub-line with ends shorted is not coupled to the coupling terminal, and thus, impedance matching between the sub-line outputting a detected signal and the coupling terminal is more effectively provided.

For example, in the directional coupler according to an aspect of the present invention, the sixth switch may be configured to, when the second connection mode is achieved by the second switch and the third switch, switch connection of the third switch and the coupling terminal to the shorted state.

With this configuration, a detected current communicated through the first sub-line is outputted from the coupling terminal.

The following describes directional couplers according to embodiments of the present invention in detail with reference to the drawings. It should be noted that the embodiments described below each represent one specific example of the present invention. Thus, the specifics including numerical values, shapes, materials, constituent elements, arrangements of the constituent elements, modes of connection of the constituent elements, steps, and the order of the steps given in the following embodiments are mere instances and are not intended to limit the present invention. Among the constituent elements in the following embodiments, constituent elements not recited in any of the independent claims are described as arbitrary constituent elements.

Further, the drawings are schematic drawings and are not necessarily depicted in an exact manner. Thus, for example, the drawings are not consistent in terms of scale. Like reference symbols are used to denote substantially like configurations in the drawings, and redundant descriptions thereof are omitted or simplified.

First Embodiment

Figure 2:
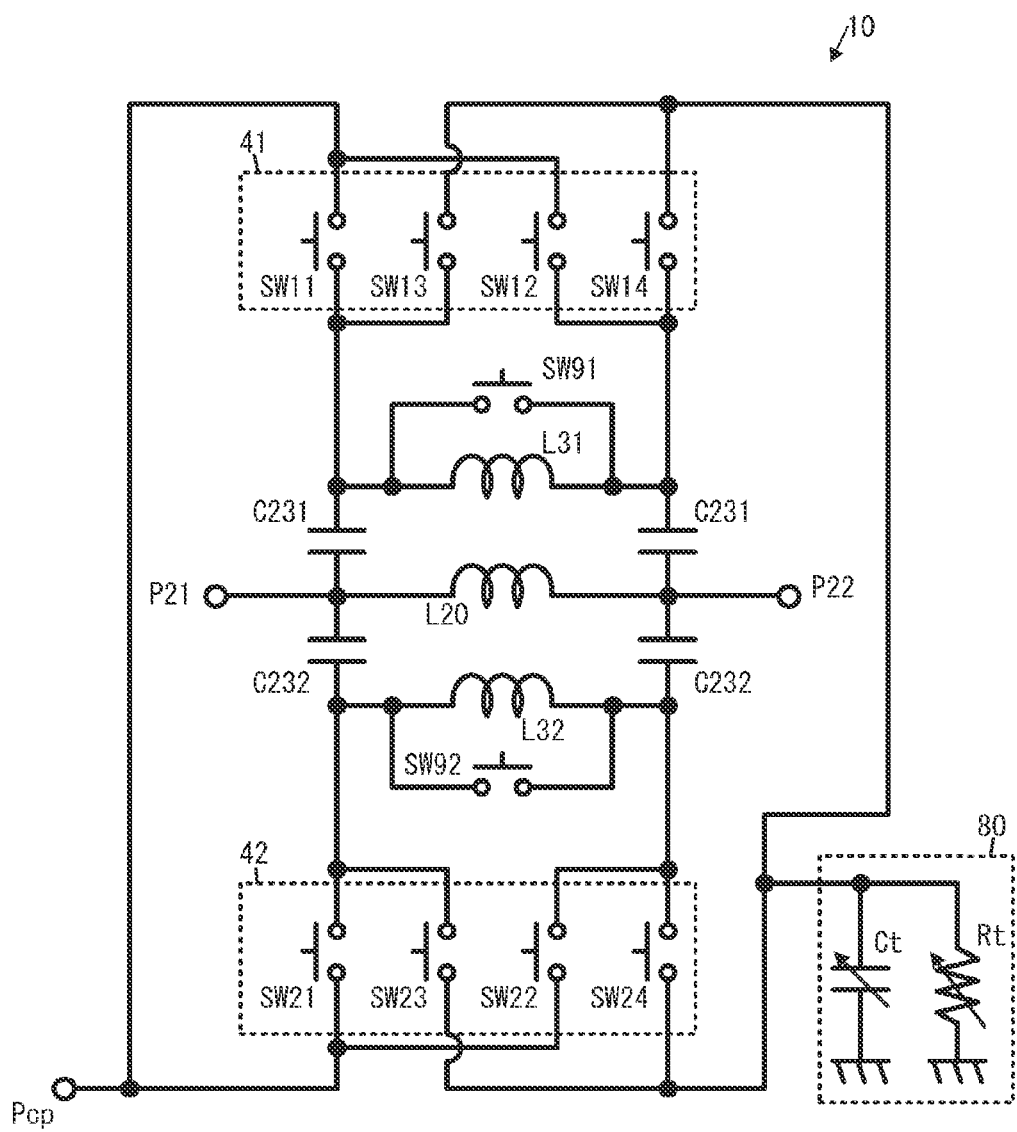
FIG. 2 is an equivalent circuit diagram of the directional coupler according to the first embodiment.

A directional coupler according to a first embodiment of the present invention will be described with reference to the drawings. FIG. 1 is a configuration diagram of the directional coupler according to the first embodiment. FIG. 2 is an equivalent circuit diagram of the directional coupler according to the first embodiment.

As illustrated in FIG. 1, a directional coupler 10 includes a main line 20, sub-lines 31 and 32, switching circuits 41 and 42, switches SW91 and SW92, input-output terminals P21 and P22, a coupling terminal Pcp, and a termination circuit 80.

The main line 20 and the sub-lines 31 and 32 are formed by, for example, conductor patterns formed at an insulating substrate. The switching circuits 41 and 42, the switches SW91 and SW92, and the termination circuit 80 are formed by, for example, mounting electronic components mounted at the insulating substrate and conductor patterns formed at the insulating substrate. The input-output terminals P21 and P22 and the coupling terminal Pcp are formed by, for example, terminal conductor patterns formed at the insulating substrate.

The main line 20 is elongated in a particular direction (for example, elongated linearly). One end of the main line 20 is coupled to the input-output terminal P21, and the other end of the main line 20 is coupled to the input-output terminal P22.

The sub-line 31 is located at a position that enables the sub-line 31 to be electromagnetically coupled to the main line 20. For example, the sub-line 31 is elongated in the direction along the main line 20, spaced apart by a particular distance from the main line 20. At this time, the shape of the sub-line 31 and the position of the sub-line 31 relative to the main line 20 are determined such that a desired degree of coupling with the main line 20 is achieved in a first frequency band.

The sub-line 32 is located at a position that enables the sub-line 32 to be electromagnetically coupled to the main line 20. For example, the sub-line 32 is elongated in the direction along the main line 20, spaced apart by a particular distance from the main line 20. At this time, the shape of the sub-line 32 and the position of the sub-line 32 relative to the main line 20 are determined such that a desired degree of coupling with the main line 20 is achieved in a second frequency band.

The second frequency band does not completely coincide with the first frequency band. In other words, the second frequency band is different from the first frequency band. For example, the second frequency band may be a frequency band on the high frequency side with respect to the first frequency band. In this case, as illustrated in FIG. 1, the length of the sub-line 32 along the main line 20 is shorter than the length of the sub-line 31 along the main line 20. For example, the second frequency band may be a frequency band including 1.5 [GHz] or higher, of a particular frequency band width; the first frequency band may be a frequency band below 1.5 [GHz], of a particular frequency band width. The first frequency band and the second frequency band are merely an example, and this should not be interpreted as limiting.

The sub-line 31 has an end portion 311 at one end in the length direction and an end portion 312 at the other end in the length direction. The sub-line 32 has an end portion 321 at one end in the length direction and an end portion 322 at the other end in the length direction. One of the sub-lines 31 and 32 corresponds to a "first sub-line" of the present invention, and the other of the sub-lines 31 and 32 corresponds to a "second sub-line" of the present invention. When the sub-line 31 is the first sub-line, the end portion 311 corresponds to a "first end" of the present invention, and the end portion 312 corresponds to a "second end" of the present invention. When the sub-line 32 is the first sub-line, the end portion 321 corresponds to the "first end" of the present invention, and the end portion 322 corresponds to the "second end" of the present invention. When the sub-line 31 is the first sub-line, the end portion 312 may correspond to the "first end" of the present invention, and the end portion 311 may correspond to the "second end" of the present invention. When the sub-line 32 is the first sub-line, the end portion 322 may correspond to the "first end" of the present invention, and the end portion 321 may correspond to the "second end" of the present invention.

The switching circuit 41 includes switches SW11, SW12, SW13, and SW14. The switch SW11 is coupled between the end portion 311 of the sub-line 31 and the coupling terminal Pcp. The switch SW11 switches connection of the end portion 311 and the coupling terminal Pcp between a shorted state and an open state. The switch SW12 is coupled between the end portion 312 of the sub-line 31 and the coupling terminal Pcp. The switch SW12 switches connection of the end portion 312 and the coupling terminal Pcp between the shorted state and the open state. The switch SW13 is coupled between the end portion 311 of the sub-line 31 and the termination circuit 80. The switch SW13 switches connection of the end portion 311 and the termination circuit 80 between the shorted state and the open state. The switch SW14 is coupled between the end portion 312 of the sub-line 31 and the termination circuit 80. The switch SW14 switches connection of the end portion 312 and the termination circuit 80 between the shorted state and the open state.

A coupling terminal Pcp side of the switch SW11 and a coupling terminal Pcp side of the switch SW12 are coupled to each other. A termination circuit 80 side of the switch SW13 and a termination circuit 80 side of the switch SW14 are coupled to each other. When the sub-line 31 is the "first sub-line", the switches SW11, SW12, SW13, and SW14 respectively correspond to a "first switch", a "second switch", a "third switch", and a "fourth switch" of the present invention.

The switching circuit 42 includes switches SW21, SW22, SW23, and SW24. The switch SW21 is coupled between the end portion 321 of the sub-line 32 and the coupling terminal Pcp. The switch SW21 switches connection of the end portion 321 and the coupling terminal Pcp between the shorted state and the open state. The switch SW22 is coupled between the end portion 322 of the sub-line 31 and the coupling terminal Pcp. The switch SW22 switches connection of the end portion 322 and the coupling terminal Pcp between the shorted state and the open state. The switch SW23 is coupled between the end portion 321 of the sub-line 32 and the termination circuit 80. The switch SW23 switches connection of the end portion 321 and the termination circuit 80 between the shorted state and the open state. The switch SW24 is coupled between the end portion 322 of the sub-line 32 and the termination circuit 80. The switch SW24 switches connection of the end portion 322 and the termination circuit 80 between the shorted state and the open state.

A coupling terminal Pcp side of the switch SW21 and a coupling terminal Pcp side of the switch SW22 are coupled to each other. A termination circuit 80 side of the switch SW23 and a termination circuit 80 side of the switch SW24 are coupled to each other. When the sub-line 32 is the "first sub-line", the switches SW21, SW22, SW23, and SW24 respectively correspond to the "first switch", the "second switch", the "third switch", and the "fourth switch" of the present invention.

In the directional coupler 10, the "first switch", the "second switch", the "third switch", and the "fourth switch" are provided for each of the sub-lines 31 and 32, but the "first switch", the "second switch", the "third switch", and the "fourth switch" may be provided for only either the sub-line 31 or 32. The switching circuits 41 and 42 correspond to a "second switching circuit" of the present invention.

The switch SW91 is coupled between the end portions 311 and 312 of the sub-line 31. The switch SW91 switches connection of the end portions 311 and 312 between the shorted state and the open state. When the sub-line 31 is the "first sub-line", the switch SW91 corresponds to a "first switching circuit" of the present invention.

The switch SW92 is coupled between the end portions 321 and 322 of the sub-line 32. The switch SW92 switches connection of the end portions 321 and 322 between the shorted state and the open state. When the sub-line 32 is the "first sub-line", the switch SW92 corresponds to the "first switching circuit" of the present invention.

In the directional coupler 10, the "first switching circuit" is provided for each of the sub-lines 31 and 32, but the "first switching circuit" may be provided for only either the sub-line 31 or 32.

The termination circuit 80 includes a variable resistor Rt and a variable capacitor Ct. A parallel circuit of the variable resistor Rt and the variable capacitor Ct couples the switches SW13, SW14, SW23, and SW24 to a reference potential.

In this configuration, as illustrated in FIG. 2, a coupling capacitance C231 is generated between the main line 20 (an inductance L20) and the sub-line 31 (an inductance L31).

Also, a coupling capacitance C232 is generated between the main line 20 (the inductance L20) and the sub-line 32 (an inductance L32). In other words, in the directional coupler 10, the degree of electromagnetic coupling between the main line 20 and the sub-line 31 is controlled by changing the coupling capacitance C231, and as a result, a coupling signal of a desired level can be obtained in the first sub-line 31. Similarly, in the directional coupler 10, the degree of electromagnetic coupling between the main line 20 and the sub-line 32 is controlled by changing the coupling capacitance C232, and as a result, a coupling signal of a desired level can be obtained in the second sub-line 32.

[Connection Configuration of Directional Coupler 10]

The directional coupler 10 configured as described above outputs a detected signal corresponding to a radio-frequency signal communicated through the main line 20 from the coupling terminal Pcp along various connection configurations described below.

Figure 3:
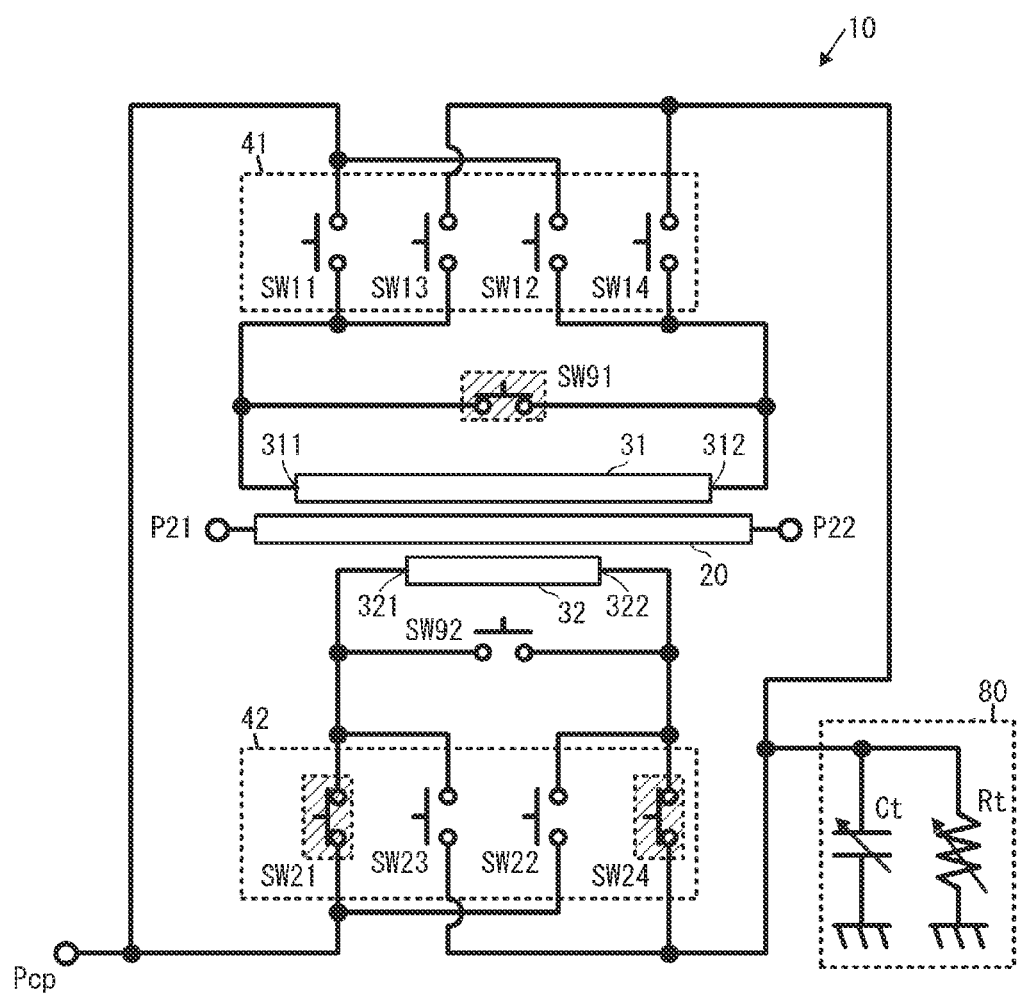
FIG. 3 is a state diagram illustrating a first connection configuration of the directional coupler according to the first embodiment.

(1-1) Configuration for Outputting Detected Signal Communicated from End Portion 322 Side to End Portion 321 Side of Sub-Line 32 from Coupling Terminal Pcp FIG. 3 is a state diagram illustrating a first connection configuration of the directional coupler according to the first embodiment.

As illustrated in FIG. 3, the switches SW21 and SW24 of the switching circuit 42 are in the shorted state. The switches SW22 and SW23 of the switching circuit 42 are in the open state. As a result, the end portion 321 of the sub-line 32 is coupled to the coupling terminal Pcp but not coupled to the termination circuit 80. The end portion 322 of the sub-line 32 is coupled to the termination circuit 80 but not coupled to the coupling terminal Pcp. The switch SW92 is in the open state.

The switches SW11, SW12, SW13, and SW14 of the switching circuit 41 are in the open state.

With this configuration, the directional coupler 10 outputs from the coupling terminal Pcp a detected signal induced in the sub-line 32 and communicated from the end portion 322 side to the end portion 321 side. At this time, a detected signal induced in the sub-line 32 and communicated from the end portion 322 side to the end portion 321 side is a signal corresponding to a radio-frequency signal communicated from the input-output terminal P21 side to the input-output terminal P22 side in the main line 20.

At this time, the switch SW91 is in the shorted state. As a result, the end portions 311 and 312 of the sub-line 31 are coupled to each other. By implementing this configuration, the effect of the inductance L31 of the sub-line 31 is reduced, and as a result, the capacitance component of the sub-line 31 coupled to the main line 20 in the equivalent circuit is changed, as compared to a configuration (a known configuration) in which the end portions 311 and 312 of the sub-line 31 are not coupled to each other.

Accordingly, the frequency of parallel resonance of the inductance L20 of the main line 20 and the capacitance component of the sub-line 31 is changed. In this manner, it is possible to change the position of the attenuation pole in the transfer characteristic of the main line 20 at a particular frequency.

Figure 4:
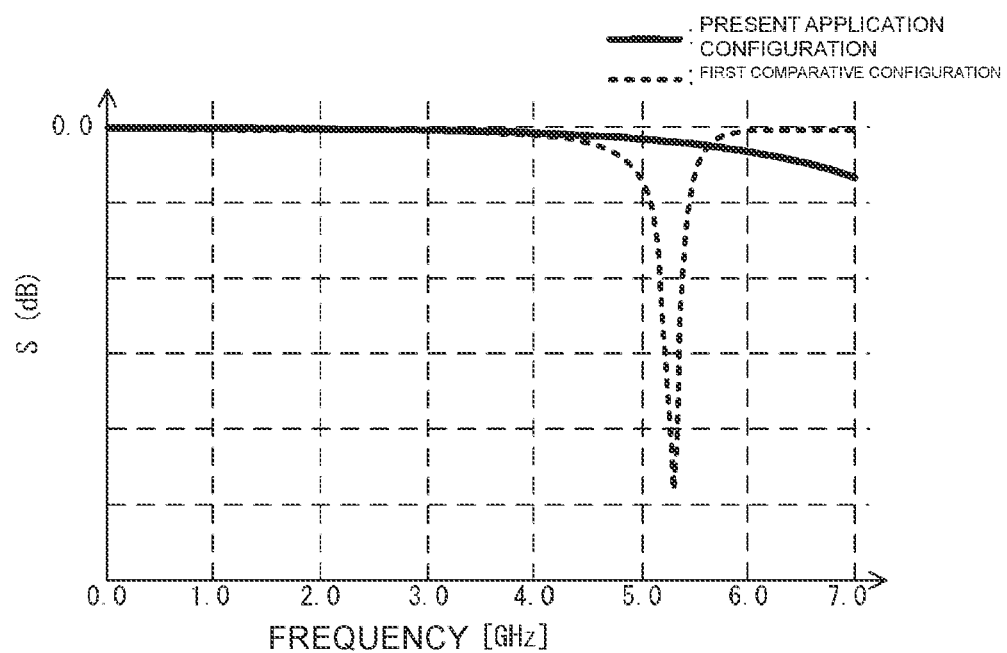
FIG. 4 is a graph illustrating an example of a simulation result of the transfer characteristic of a main line (S21).

FIG. 4 is a graph illustrating an example of a simulation result of the transfer characteristic of the main line (S21) in dB verses frequency in GHz. In FIG. 4, a solid line indicates the characteristic of the configuration of the present application, and a dashed line indicates the characteristic of a first comparative configuration. The comparative configuration is a configuration without the switch SW91 according to the invention of the present application.

As illustrated in FIG. 4, as the result of making the end portions 311 and 312 of the sub-line 31 shorted by the switch SW91, the attenuation pole of the main line at a particular frequency (in the case in FIG. 4, about 5.2 [GHz]) is shifted to the high frequency side (in the case in FIG. 4, the frequency side higher than 7.0 [GHz]).

As a result, it is possible to suppress significant degradation of the transfer characteristic of the main line 20 over a wider frequency band and thus achieve a transfer characteristic with low loss. Consequently, while suppressing transfer loss of radio-frequency signals flowing through the main line 20 over a wider frequency band, the directional coupler 10 can obtain a detected signal in a desired frequency band.

With this configuration, the coupling capacitance of the sub-line 31 side to the main line 20 can be changed by turning the switch SW91 into the shorted state. It is not easy to change the degree of coupling between the sub-line 31 not outputting a detected signal and the main line 20 in a physical manner. When the main line 20 and the sub-line 31 are formed at the same insulating substrate, changing the degree of coupling is more difficult. However, by using this configuration, the coupling capacitance of the sub-line 31 side to the main line 20 can be changed without changing, for example, the physical positional relationship between the main line 20 and the sub-line 31.

Figure 5:
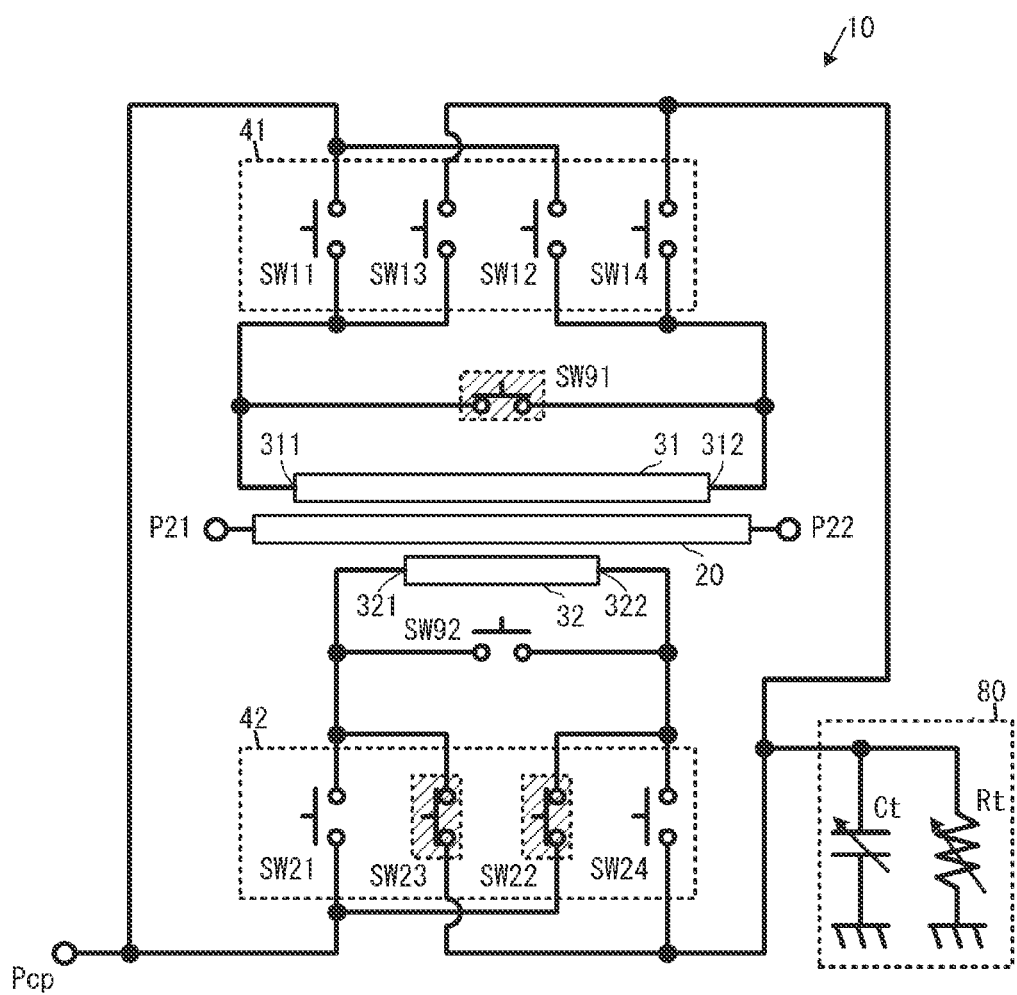
FIG. 5 is a state diagram illustrating a second connection configuration of the directional coupler according to the first embodiment.

(1-2) Mode for Outputting Detected Signal Communicated from End Portion 321 Side to End Portion 322 Side of Sub-Line 32 from Coupling Terminal Pcp FIG. 5 is a state diagram illustrating a second connection configuration of the directional coupler according to the first embodiment.

The switches SW22 and SW23 of the switching circuit 42 are in the shorted state. The switches SW21 and SW24 of the switching circuit 42 are in the open state. As a result, the end portion 322 of the sub-line 32 is coupled to the coupling terminal Pcp but not coupled to the termination circuit 80. The end portion 321 of the sub-line 32 is coupled to the termination circuit 80 but not coupled to the coupling terminal Pcp. The switch SW92 is in the open state.

The switches SW11, SW12, SW13, and SW14 of the switching circuit 41 are in the open state.

With this configuration, the directional coupler 10 outputs from the coupling terminal Pcp a detected signal induced in the sub-line 32 and communicated from the end portion 321 side to the end portion 322 side. At this time, a detected signal induced in the sub-line 32 and communicated from the end portion 321 side to the end portion 322 side is a signal corresponding to a radio-frequency signal communicated from the input-output terminal P22 side to the input-output terminal P21 side in the main line 20 (a reflected signal of a radio-frequency signal communicated from the input-output terminal P21 side to the input-output terminal P22 side in the main line 20).

At this time, the switch SW91 is in the shorted state. As a result, the end portions 311 and 312 of the sub-line 31 are coupled to each other. By implementing this configuration, similarly to the mode (1-1), it is possible to suppress significant degradation of the transfer characteristic of the main line 20 over a wider frequency band and thus achieve a transfer characteristic with low loss.

The directional coupler 10 switches between the mode (1-1) and the mode (1-2). As a result, the directional coupler 10 can output from the coupling terminal Pcp a detected current flowing through the sub-line 32 in any direction. In other words, the directional coupler 10 can output detected signals of both a radio-frequency signal communicated from the input-output terminal P21 to the input-output terminal P22 in the main line 20 and a radio-frequency signal communicated from the input-output terminal P22 to the input-output terminal P21 in the main line 20 of a frequency band detectable in the sub-line 32. At the same time, as described above, the directional coupler 10 can achieve a transfer characteristic with low loss over a wide frequency band.

Figure 6:
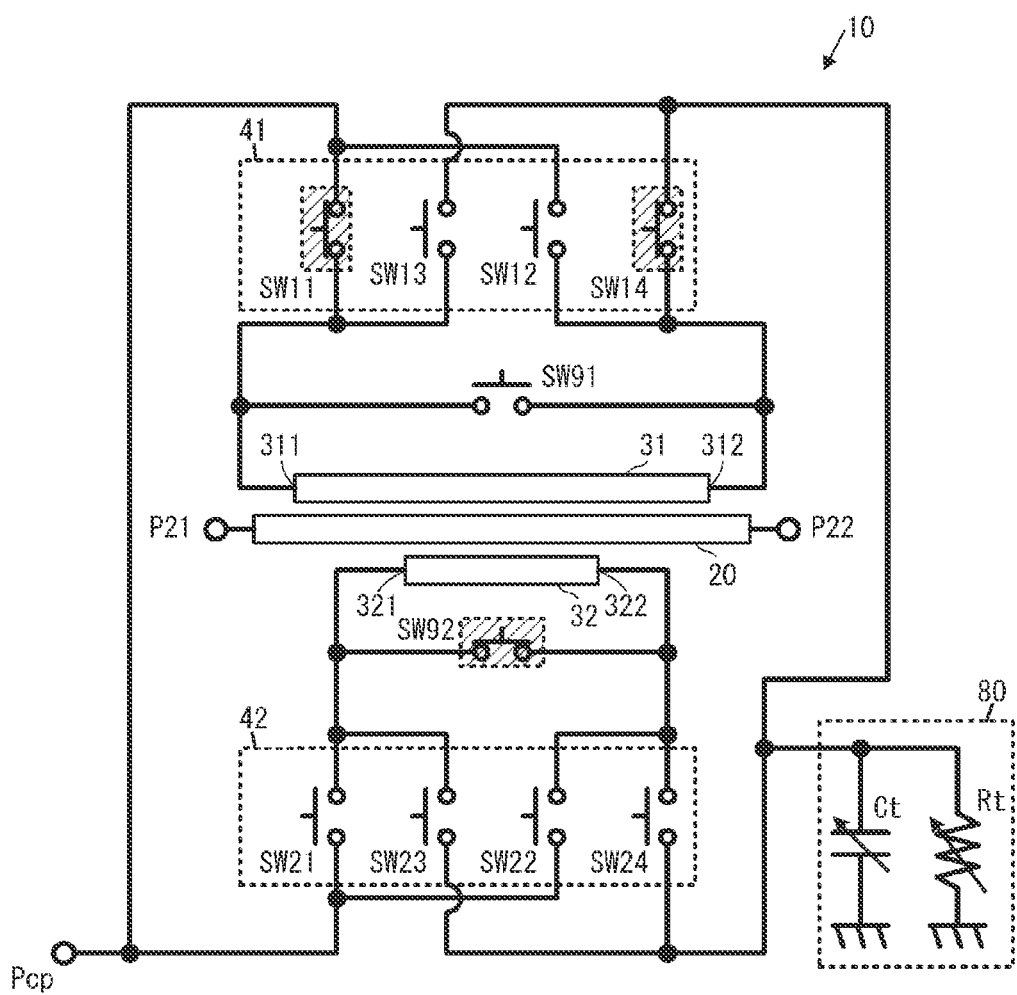
FIG. 6 is a state diagram illustrating a third connection configuration of the directional coupler according to the first embodiment.

(1-3) Mode for Outputting Detected Signal Communicated from End Portion 312 Side to End Portion 311 Side of Sub-Line 31 from the Coupling Terminal Pcp FIG. 6 is a state diagram illustrating a third connection configuration of the directional coupler according to the first embodiment.

The switches SW11 and SW14 of the switching circuit 41 are in the shorted state. The switches SW12 and SW13 of the switching circuit 41 are in the open state. As a result, the end portion 311 of the sub-line 31 is coupled to the coupling terminal Pcp but not coupled to the termination circuit 80. The end portion 312 of the sub-line 31 is coupled to the termination circuit 80 but not coupled to the coupling terminal Pcp. The switch SW91 is in the open state.

The switches SW21, SW22, SW23, and SW24 of the switching circuit 42 are in the open state.

With this configuration, the directional coupler 10 outputs from the coupling terminal Pcp a detected signal induced in the sub-line 31 and communicated from the end portion 312 side to the end portion 311 side. At this time, a detected signal induced in the sub-line 31 and communicated from the end portion 312 side to the end portion 311 side is a signal corresponding to a radio-frequency signal communicated from the input-output terminal P21 side to the input-output terminal P22 side in the main line 20.

At this time, the switch SW92 is in the shorted state. As a result, the end portions 321 and 322 of the sub-line 32 are coupled to each other. By implementing this configuration, similarly to the modes (1-1) and (1-2), it is possible to suppress significant degradation of the transfer characteristic of the main line 20 over a wider frequency band and thus achieve a transfer characteristic with low loss.

Figure 7:
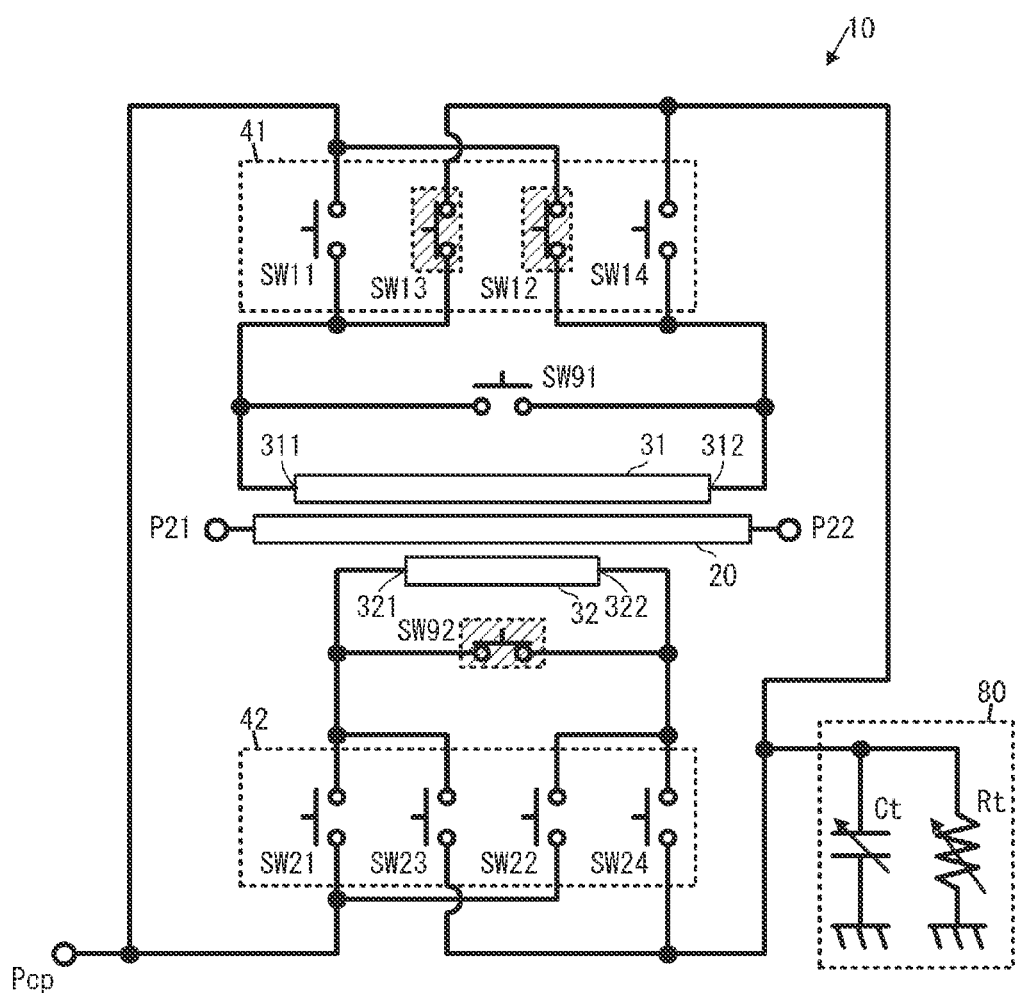
FIG. 7 is a state diagram illustrating a fourth connection configuration of the directional coupler according to the first embodiment.

(1-4) Mode for Outputting Detected Signal Communicated from End Portion 311 Side to End Portion 312 Side of Sub-Line 31 from the Coupling Terminal Pcp FIG. 7 is a state diagram illustrating a fourth connection configuration of the directional coupler according to the first embodiment.

The switches SW12 and SW13 of the switching circuit 41 are in the shorted state. The switches SW11 and SW14 of the switching circuit 41 are in the open state. As a result, the end portion 312 of the sub-line 31 is coupled to the coupling terminal Pcp but not coupled to the termination circuit 80. The end portion 311 of the sub-line 31 is coupled to the termination circuit 80 but not coupled to the coupling terminal Pcp. The switch SW91 is in the open state.

The switches SW21, SW22, SW23, and SW24 of the switching circuit 42 are in the open state.

With this configuration, the directional coupler 10 outputs from the coupling terminal Pcp a detected signal induced in the sub-line 31 and communicated from the end portion 311 side to the end portion 312 side. At this time, a detected signal induced in the sub-line 31 and communicated from the end portion 311 side to the end portion 312 side is a signal corresponding to a radio-frequency signal communicated from the input-output terminal P22 side to the input-output terminal P21 side in the main line 20 (a reflected signal of a radio-frequency signal communicated from the input-output terminal P21 side to the input-output terminal P22 side in the main line 20).

At this time, the switch SW92 is in the shorted state. As a result, the end portions 321 and 322 of the sub-line 32 are coupled to each other. By implementing this configuration, similarly to the modes (1-1), (1-2), and (1-3), it is possible to suppress significant degradation of the transfer characteristic of the main line 20 over a wider frequency band and thus achieve a transfer characteristic with low loss.

The directional coupler 10 switches between the mode (1-3) and the mode (1-4). As a result, the directional coupler 10 can output from the coupling terminal Pcp a detected current flowing through the sub-line 31 in any direction. In other words, the directional coupler 10 can output detected signals of both a radio-frequency signal communicated from the input-output terminal P21 to the input-output terminal P22 in the main line 20 and a radio-frequency signal communicated from the input-output terminal P22 to the input-output terminal P21 in the main line 20 of a frequency band detectable in the sub-line 31. At the same time, as described above, the directional coupler 10 can achieve a transfer characteristic with low loss over a wide frequency band.

Further, the directional coupler 10 switches among the modes (1-1), (1-2), (1-3), and (1-4). As a result, the directional coupler 10 can obtain bidirectional detected signals in the plurality of sub-lines 31 and 32 from the main line 20 and output the bidirectional detected signals from the coupling terminal Pcp.

As described above, the sub-lines 31 and 32 differ from each other in the frequency band of detected signal. Thus, the directional coupler 10 can suppress degradation of the transfer characteristic of the main line 20, while obtaining detected signals of a wider frequency bands.

Here, for example, it is assumed that the frequency bands detected in the sub-lines 31 and 32 are covered by a single sub-line. In this case, the degree of coupling cannot constantly reach close to a desired value over a wide frequency band. Specifically, the amount of coupling between the main line and the sub-line can be greater or smaller than a desired value at particular frequencies; otherwise, the amount of coupling between the main line and the sub-line can be relatively small over the entire detected frequency band.

However, the directional coupler 10 uses the plurality of sub-lines 31 and 32 covering different frequencies. As a result, the directional coupler 10 constantly reaches close to a desired value with respect to the degree of coupling over a wide frequency band that cannot be covered by a single sub-line.

At this time, increasing the number of sub-lines increases the coupling capacitance to the main line 20; and due to the effect of parallel resonance of the sub-lines and the main line 20, as described above, transfer loss of the main line 20 can increase at a particular frequency.

However, in the directional coupler 10, as described above, the coupling capacitance is changed by making both ends of the sub-line not used to output detected signals shorted, and this shifts the frequency at which transfer loss of the main line 20 is degraded. As a result, the directional coupler 10 can reduce transfer loss of the main line 20, while constantly reaching a desired value or greater with respect to the degree of coupling over a wide frequency band.

Second Embodiment

Figure 8:
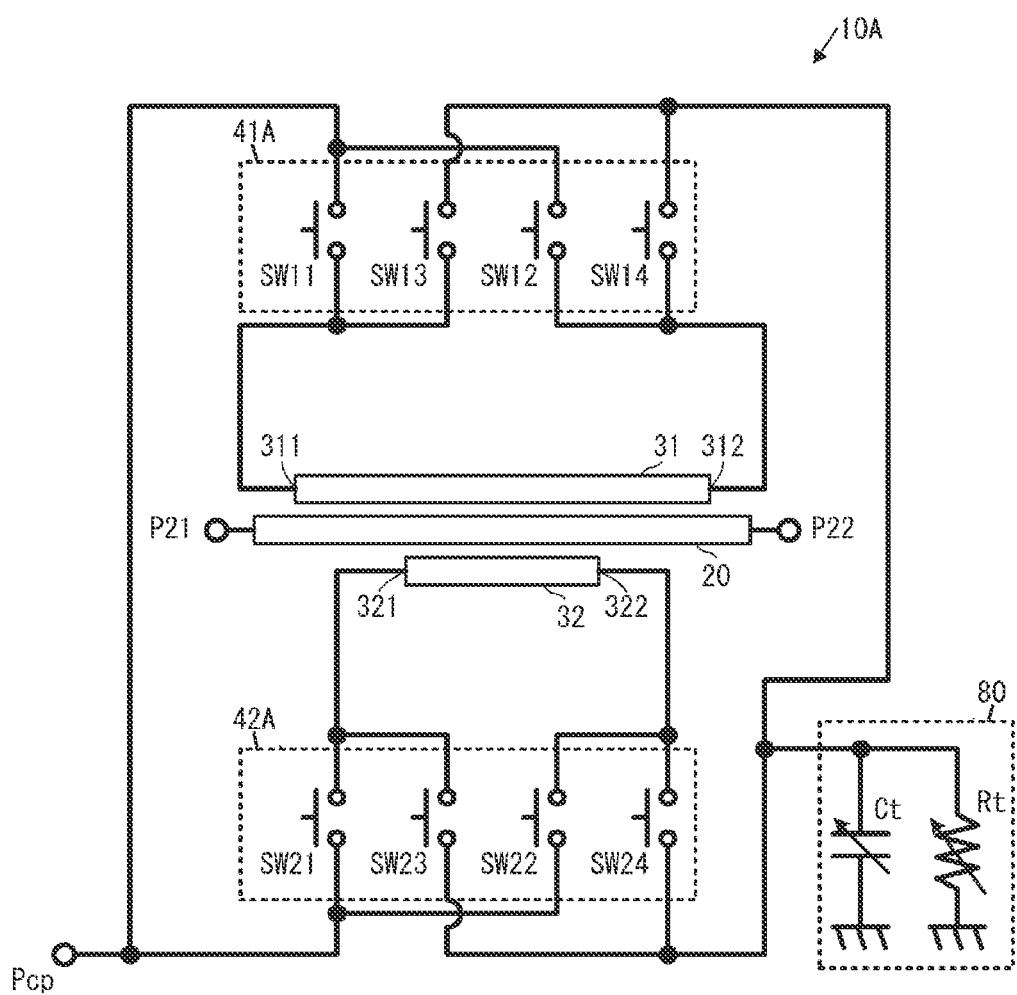
FIG. 8 is a configuration diagram of a directional coupler according to a second embodiment.

A directional coupler according to a second embodiment of the present invention will be described with reference to the drawings. FIG. 8 is a configuration diagram of the directional coupler according to the second embodiment.

A directional coupler 10A according to the second embodiment differs from the directional coupler 10 according to the first embodiment in that switching circuits 41A and 42A are included and the switches SW91 and SW92 are physically removed. Basically, in the directional coupler 10A, the switching circuit 41A additionally implements the function of the switch SW91, and the switching circuit 42A additionally implements the function of the switch SW92. Other configurations of the directional coupler 10A are the same as the directional coupler 10, and descriptions of the same configurations are not repeated.

The switching circuit 41A includes the switches SW11, SW12, SW13, and SW14. The switch SW11 is coupled between the end portion 311 of the sub-line 31 and the coupling terminal Pcp. The switch SW11 switches connection of the end portion 311 and the coupling terminal Pcp between the shorted state and the open state. The switch SW12 is coupled between the end portion 312 of the sub-line 31 and the coupling terminal Pcp. The switch SW12 switches connection of the end portion 312 and the coupling terminal Pcp between the shorted state and the open state. The switch SW13 is coupled between the end portion 311 of the sub-line 31 and the termination circuit 80. The switch SW13 switches connection of the end portion 311 and the termination circuit 80 between the shorted state and the open state. The switch SW14 is coupled between the end portion 312 of the sub-line 31 and the termination circuit 80. The switch SW14 switches connection of the end portion 312 and the termination circuit 80 between the shorted state and the open state.

A coupling terminal Pcp side of the switch SW11 and a coupling terminal Pcp side of the switch SW12 are coupled to each other. A termination circuit 80 side of the switch SW13 and a termination circuit 80 side of the switch SW14 are coupled. When the sub-line 31 is the "first sub-line", the switches SW11, SW12, SW13, and SW14 respectively correspond to the "first switch", the "second switch", the "third switch", and the "fourth switch" of the present invention.

The switching circuit 42A includes the switches SW21, SW22, SW23, and SW24. The switch SW21 is coupled between the end portion 321 of the sub-line 32 and the coupling terminal Pcp. The switch SW21 switches connection of the end portion 321 and the coupling terminal Pcp between the shorted state and the open state. The switch SW22 is coupled between the end portion 322 of the sub-line 31 and the coupling terminal Pcp. The switch SW22 switches connection of the end portion 322 and the coupling terminal Pcp between the shorted state and the open state. The switch SW23 is coupled between the end portion 321 of the sub-line 32 and the termination circuit 80. The switch SW23 switches connection of the end portion 321 and the termination circuit 80 between the shorted state and the open state. The switch SW24 is coupled between the end portion 322 of the sub-line 32 and the termination circuit 80. The switch SW24 switches connection of the end portion 322 and the termination circuit 80 between the shorted state and the open state.

A coupling terminal Pcp side of the switch SW21 and a coupling terminal Pcp side of the switch SW22 are coupled to each other. A termination circuit 80 side of the switch SW23 and a termination circuit 80 side of the switch SW24 are coupled. When the sub-line 32 is the "first sub-line", the switches SW21, SW22, SW23, and SW24 respectively correspond to the "first switch", the "second switch", the "third switch", and the "fourth switch" of the present invention.

[Connection Configuration of Directional Coupler 10A]

The directional coupler 10A configured as described above outputs a detected signal corresponding to a radio-frequency signal communicated through the main line 20 from the coupling terminal Pcp along various connection configurations described below.

Figure 9:
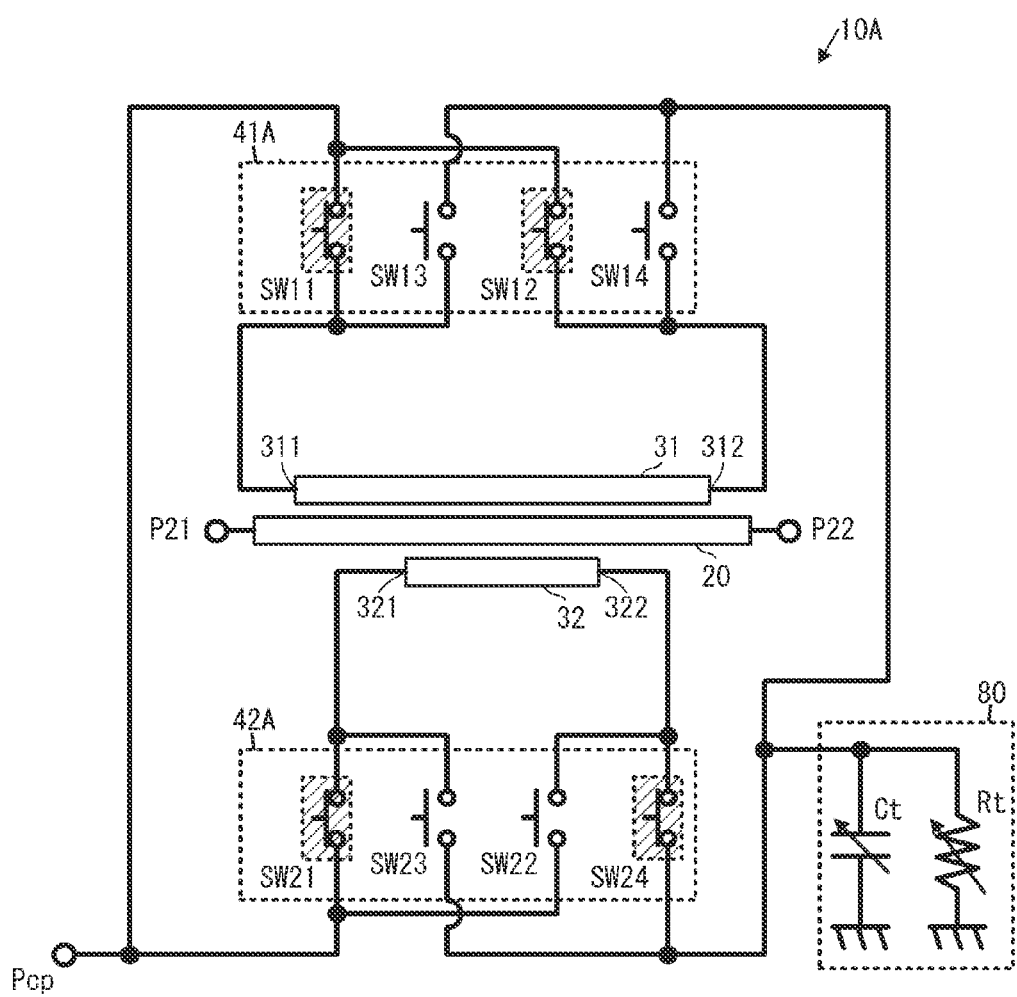
FIG. 9 is a state diagram illustrating a first connection configuration of the directional coupler according to the second embodiment.

(2-1) Configuration in which Both Ends of Sub-Line are Shorted by Controlling Switch Coupled to Coupling Terminal Pcp FIG. 9 is a state diagram illustrating a first connection configuration of the directional coupler according to the second embodiment. FIG. 9 indicates a configuration for outputting a detected signal communicated from the end portion 322 side to the end portion 321 side of the sub-line 32 from the coupling terminal Pcp.

As illustrated in FIG. 9, the switches SW21 and SW24 of the switching circuit 42A are in the shorted state. The switches SW22 and SW23 of the switching circuit 42A are in the open state. As a result, the end portion 321 of the sub-line 32 is coupled to the coupling terminal Pcp but not coupled to the termination circuit 80. The end portion 322 of the sub-line 32 is coupled to the termination circuit 80 but not coupled to the coupling terminal Pcp.

With this configuration, the directional coupler 10A outputs from the coupling terminal Pcp a detected signal induced in the sub-line 32 and communicated from the end portion 322 side to the end portion 321 side.

The switches SW11 and SW12 of the switching circuit 41A are in the shorted state. The switches SW13 and SW14 of the switching circuit 41A are in the open state.

With this configuration, the end portions 311 and 312 of the sub-line 31 are coupled. This means that a circuit similar to the circuit in which the switch SW91 is in the shorted state in the first embodiment (which corresponds to the mode (1-1) of the first embodiment) is formed.

Similarly, the mode for outputting a detected signal communicated from the end portion 321 side to the end portion 322 side of the sub-line 32 from the coupling terminal Pcp (which corresponds to the mode (1-2) of the first embodiment), the mode for outputting a detected signal communicated from the end portion 312 side to the end portion 311 side of the sub-line 31 from the coupling terminal Pcp (which corresponds to the mode (1-3) of the first embodiment), and the mode for outputting a detected signal communicated from the end portion 311 side to the end portion 312 side of the sub-line 31 from the coupling terminal Pcp (which corresponds to the mode (1-4) of the first embodiment) are formed by making both ends of the sub-line 31 or both ends of the sub-line 32 shorted using the switching circuit 41A or 42A, but detailed descriptions and illustrations thereof are omitted.

As a result, the directional coupler 10A can reduce transfer loss of the main line 20, while constantly reaching close to a desired value with respect to the degree of coupling over a wide frequency band.

Further, the directional coupler 10A eliminates switches for controlling the shorted state of both ends of a corresponding sub-line not used for detection, thereby reducing the circuit size. Furthermore, the number of switches coupled to sub-lines but not used directly to switch outputs of detected signals is decreased. As a result, the degree of coupling in a desired frequency band is increased, and the effect of reducing transfer loss of the main line 20 is improved.

In the mode (2-1), the sub-line with ends shorted is not coupled to the termination circuit 80. With this configuration, the directional coupler 10A can inhibit adverse effects caused because the termination circuit 80 is coupled to the sub-line with ends shorted, such as power leakage to the termination circuit 80, and thus, desired characteristics are easily achieved.

Figure 10:
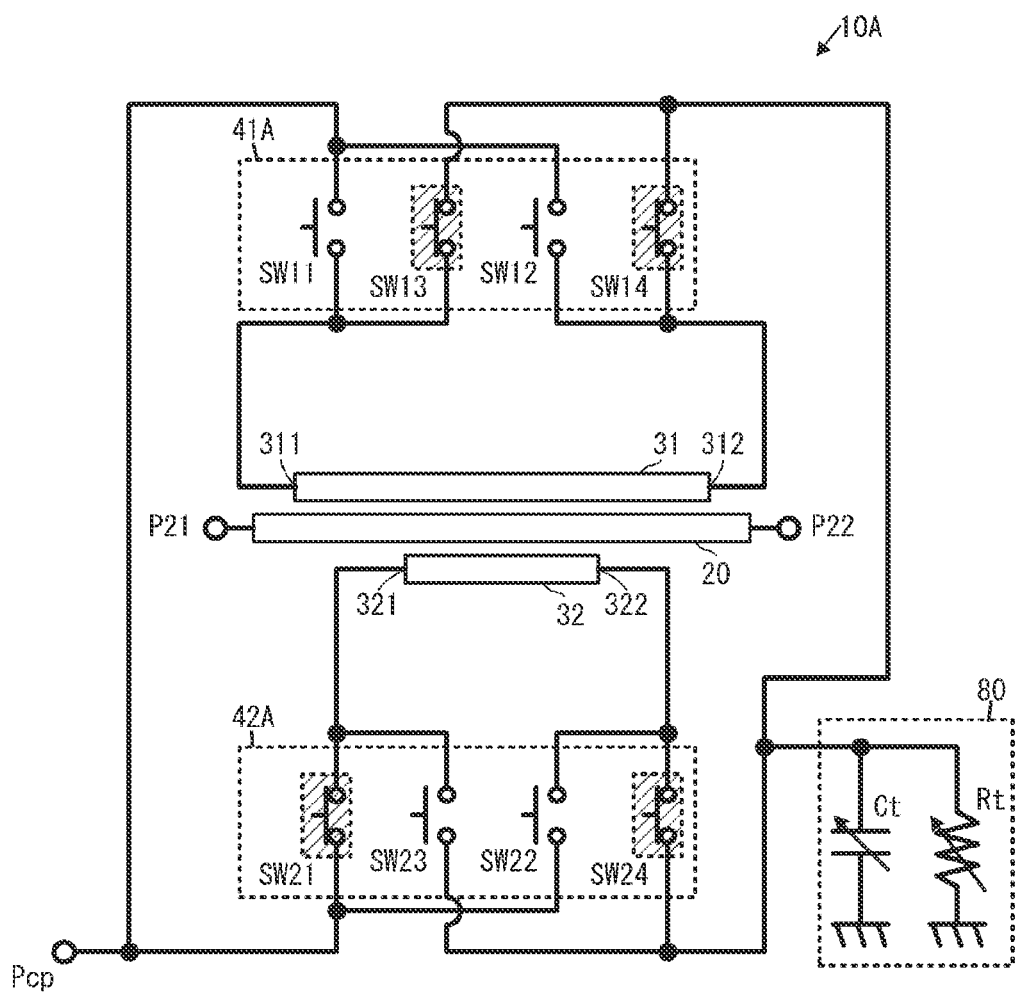
FIG. 10 is a state diagram illustrating a second connection configuration of the directional coupler according to the second embodiment.

(2-2) Configuration in which Both Ends of Sub-Line are Shorted by Controlling Switch Coupled to Termination Circuit FIG. 10 is a state diagram illustrating a second connection configuration of the directional coupler according to the second embodiment. Similarly to FIG. 9, FIG. 10 indicates a configuration for outputting a detected signal communicated from the end portion 322 side to the end portion 321 side of the sub-line 32 from the coupling terminal Pcp.

As illustrated in FIG. 10, the switches SW21 and SW24 of the switching circuit 42A are in the shorted state. The switches SW22 and SW23 of the switching circuit 42A are in the open state. As a result, the end portion 321 of the sub-line 32 is coupled to the coupling terminal Pcp but not coupled to the termination circuit 80. The end portion 322 of the sub-line 32 is coupled to the termination circuit 80 but not coupled to the coupling terminal Pcp.

With this configuration, the directional coupler 10 outputs from the coupling terminal Pcp a detected signal induced in the sub-line 32 and communicated from the end portion 322 side to the end portion 321 side.

The switches SW13 and SW14 of the switching circuit 41A are in the shorted state. The switches SW11 and SW12 of the switching circuit 41A are in the open state.

With this configuration, the end portions 311 and 312 of the sub-line 31 are coupled. This means that a circuit similar to the circuit in which the switch SW91 is in the shorted state in the first embodiment (which corresponds to the mode (1-1) of the first embodiment) is formed.

Similarly, the mode for outputting a detected signal communicated from the end portion 321 side to the end portion 322 side of the sub-line 32 from the coupling terminal Pcp (which corresponds to the mode (1-2) of the first embodiment), the mode for outputting a detected signal communicated from the end portion 312 side to the end portion 311 side of the sub-line 31 from the coupling terminal Pcp (which corresponds to the mode (1-3) of the first embodiment), and the mode for outputting a detected signal communicated from the end portion 311 side to the end portion 312 side of the sub-line 31 from the coupling terminal Pcp (which corresponds to the mode (1-4) of the first embodiment) are formed by making both ends of the sub-line 31 or both ends of the sub-line 32 shorted using the switching circuit 41A or 42A, but detailed descriptions and illustrations thereof are omitted.

As such, with the mode (2-2), the directional coupler 10A can achieve the same effects and advantages as the mode (2-1) described above.

In the mode (2-2), the sub-line with ends shorted is not coupled to the coupling terminal Pcp. With this configuration, the directional coupler 10A can inhibit adverse effects caused because the coupling terminal Pcp is coupled to the sub-line with ends shorted, such as power leakage to the coupling terminal Pcp, and adverse effects caused by other circuits coupled to the coupling terminal Pcp, and thus, desired characteristics are easily achieved. Further, in the mode (2-2), the sub-line with ends shorted is not coupled to the coupling terminal Pcp, and thus, impedance matching between the sub-line outputting a detected signal and the coupling terminal Pcp is more effectively provided.

Third Embodiment

Figure 11:
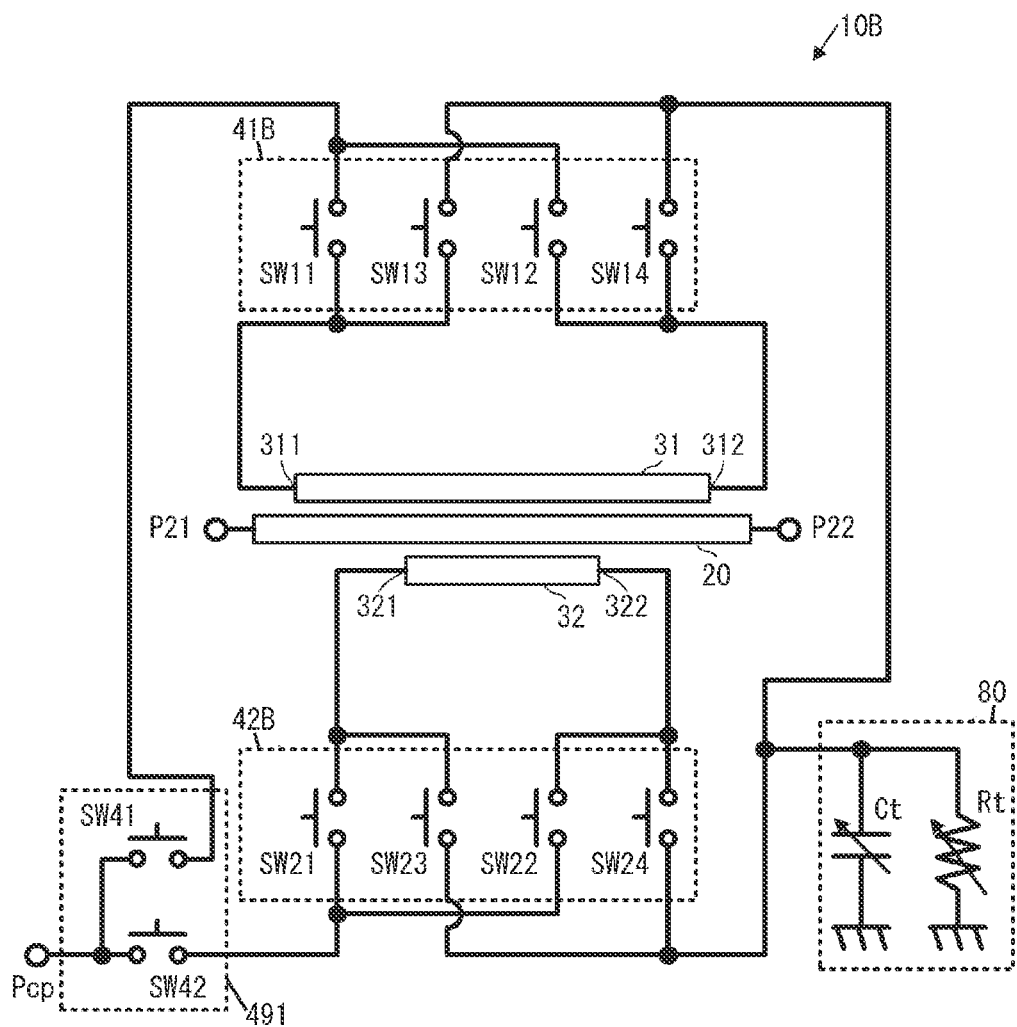
FIG. 11 is a configuration diagram of a directional coupler according to a third embodiment.

A directional coupler according to a third embodiment of the present invention will be described with reference to the drawings. FIG. 11 is a configuration diagram of the directional coupler according to the third embodiment.

A directional coupler 10B according to the third embodiment differs from the directional coupler 10A according to the second embodiment in that a switching circuit 491 is added to the directional coupler 10B. Other configurations of the directional coupler 10B are the same as the directional coupler 10A, and descriptions of the same configurations are not repeated.

The switching circuit 491 is coupled between switching circuits 41B and 42B and the coupling terminal Pcp. The switching circuit 41B is configured in the same manner as the switching circuit 41A. The switching circuit 42B is configured in the same manner as the switching circuit 42A. The switching circuit 491 functions as a part of the "second switching circuit" of the present invention.

More specifically, the switching circuit 491 includes switches SW41 and SW42. When the sub-line 31 is the "first sub-line", the switch SW41 corresponds to a "fifth switch" of the present invention. When the sub-line 32 is the "first sub-line", the switch SW42 corresponds to the "fifth switch" of the present invention.

The switch SW41 is coupled between the switches SW11 and SW12 of the switching circuit 41B and the coupling terminal Pcp. The switch SW41 switches connection of the switches SW11 and SW12 and the coupling terminal Pcp between the shorted state and the open state. The switch SW42 is coupled between the switches SW21 and SW22 of the switching circuit 42B and the coupling terminal Pcp. The switch SW42 switches connection of the switches SW21 and SW22 and the coupling terminal Pcp between the shorted state and the open state.

[Connection Configuration of Directional Coupler 10B]

The directional coupler 10B configured as described above outputs a detected signal corresponding to a radio-frequency signal communicated through the main line 20 from the coupling terminal Pcp along various connection configurations described below.

Figure 12:
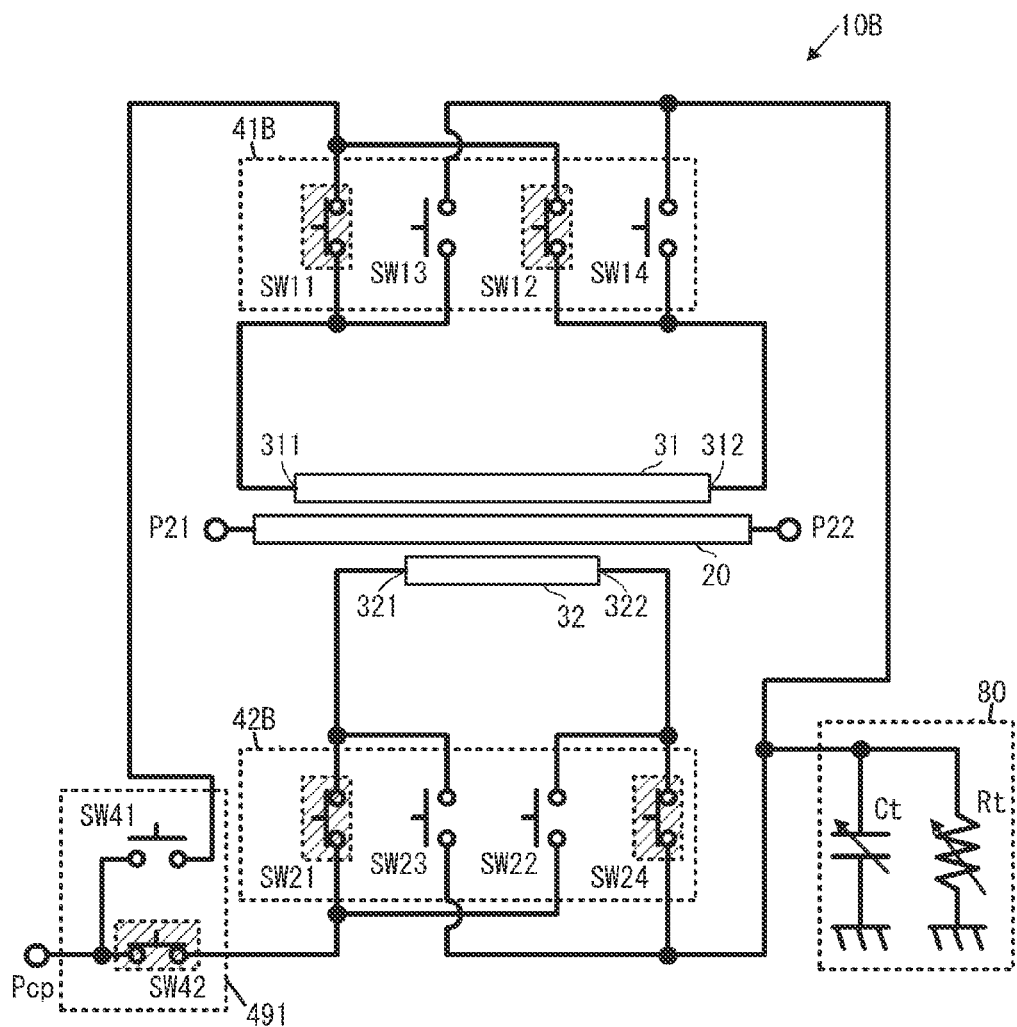
FIG. 12 is a state diagram illustrating a first connection configuration of the directional coupler according to the third embodiment.

(3-1) Configuration for Outputting Detected Signal Communicated from End Portion 322 Side to End Portion 321 Side of Sub-Line 32 from Coupling Terminal Pcp FIG. 12 is a state diagram illustrating a first connection configuration of the directional coupler according to the third embodiment.

As illustrated in FIG. 12, the switches SW21 and SW24 of the switching circuit 42B are in the shorted state. The switches SW22 and SW23 of the switching circuit 42B are in the open state. As a result, the end portion 321 of the sub-line 32 is coupled to the switch SW42 of the switching circuit 491 but not coupled to the termination circuit 80. The end portion 322 of the sub-line 32 is coupled to the termination circuit 80 but not coupled to the coupling terminal Pcp.

The switch SW42 of the switching circuit 491 is in the shorted state. As a result, the end portion 321 of the sub-line 32 is coupled to the coupling terminal Pcp via the switches SW21 and SW42.

With this configuration, the directional coupler 10B outputs from the coupling terminal Pcp a detected signal induced in the sub-line 32 and communicated from the end portion 322 side to the end portion 321 side.

The switches SW11 and SW12 of the switching circuit 41B are in the shorted state. The switches SW13 and SW14 of the switching circuit 41B are in the open state.

With this configuration, the end portions 311 and 312 of the sub-line 31 are coupled. This means that a circuit similar to the circuit in which the switch SW91 is in the shorted state in the first embodiment (which corresponds to the mode (1-1) of the first embodiment) is formed.

The switch SW41 of the switching circuit 491 is in the open state. As a result, the switches SW11 and SW12 of the switching circuit 41B and also the sub-line 31 are not coupled to the coupling terminal Pcp.

Similarly, in the mode for outputting a detected signal communicated from the end portion 321 side to the end portion 322 side of the sub-line 32 from the coupling terminal Pcp (which corresponds to the mode (1-2) of the first embodiment), the end portions 311 and 312 of the sub-line 31 are coupled, but detailed descriptions and illustrations thereof are omitted.

As a result, the directional coupler 10B can reduce transfer loss of the main line 20, while constantly reaching a desired value or greater with respect to the degree of coupling over a wide frequency band.

In the mode (3-1), the sub-line 31 with ends shorted is not coupled to the coupling terminal Pcp. With this configuration, the directional coupler 10B can inhibit adverse effects caused because the coupling terminal Pcp is coupled to the sub-line 31 with ends shorted, such as power leakage to the coupling terminal Pcp, and adverse effects caused by other circuits coupled to the coupling terminal Pcp, and thus, desired characteristics are easily achieved. Further, in the mode (3-1), the sub-line 31 with ends shorted is not coupled to the coupling terminal Pcp, and thus, impedance matching between the sub-line 32 outputting a detected signal and the coupling terminal Pcp is more effectively provided.

Figure 13:
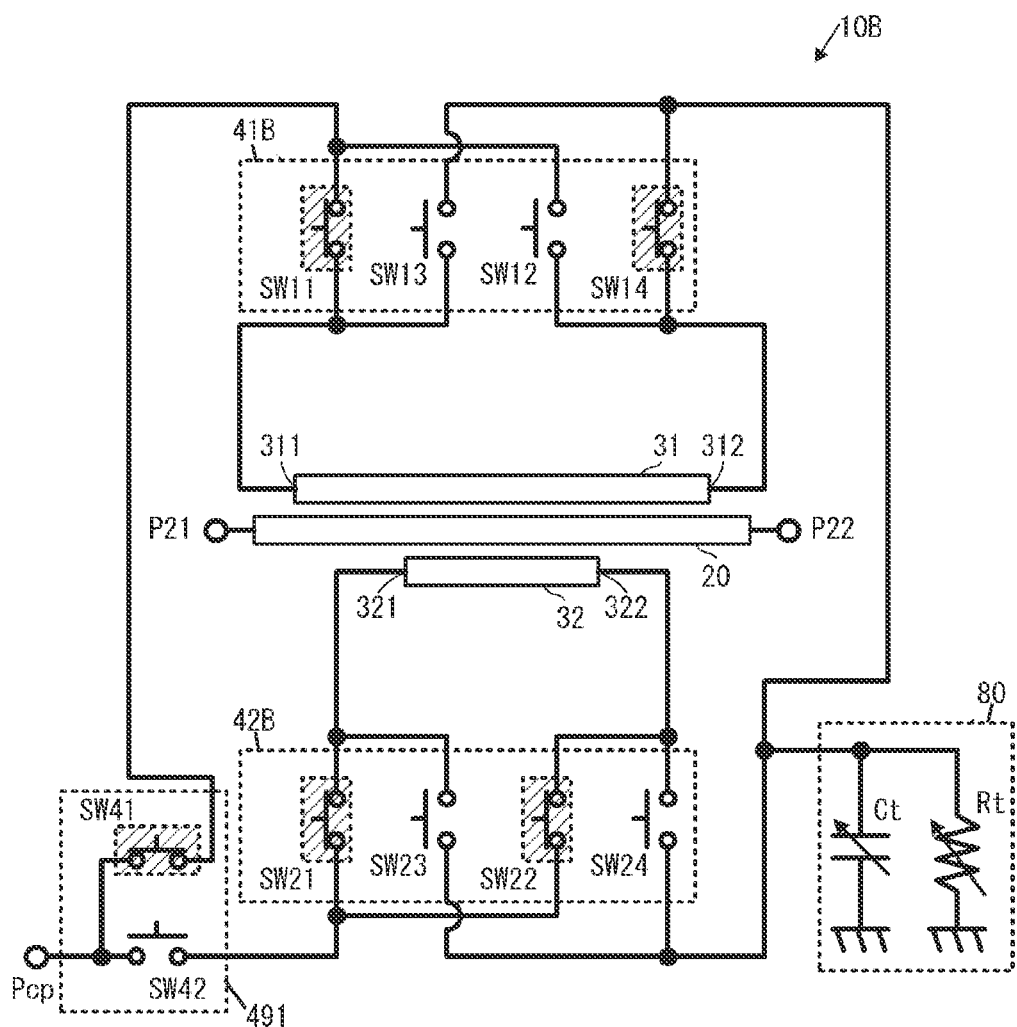
FIG. 13 is a state diagram illustrating a second connection configuration of the directional coupler according to the third embodiment.

(3-2) Configuration for Outputting Detected Signal Communicated from End Portion 312 Side to End Portion 311 Side of Sub-Line 31 from Coupling Terminal Pcp FIG. 13 is a state diagram illustrating a second connection configuration of the directional coupler according to the third embodiment.

As illustrated in FIG. 13, the switches SW11 and SW14 of the switching circuit 41B are in the shorted state. The switches SW12 and SW13 of the switching circuit 41B are in the open state. As a result, the end portion 311 of the sub-line 31 is coupled to the switch SW41 of the switching circuit 491 but not coupled to the termination circuit 80. The end portion 312 of the sub-line 31 is coupled to the termination circuit 80 but not coupled to the coupling terminal Pcp.

The switch SW41 of the switching circuit 491 is in the shorted state. As a result, the end portion 311 of the sub-line 31 is coupled to the coupling terminal Pcp via the switches SW11 and SW41.

With this configuration, the directional coupler 10B outputs from the coupling terminal Pcp a detected signal induced in the sub-line 31 and communicated from the end portion 312 side to the end portion 311 side.

The switches SW21 and SW22 of the switching circuit 42B are in the shorted state. The switches SW23 and SW24 of the switching circuit 42B are in the open state.

With this configuration, the end portions 321 and 322 of the sub-line 32 are coupled. This means that a circuit similar to the circuit in which the switch SW92 is in the shorted state in the first embodiment (which corresponds to the mode (1-3) of the first embodiment) is formed.

The switch SW42 of the switching circuit 491 is in the open state. As a result, the switches SW21 and SW22 of the switching circuit 42B and also the sub-line 32 are not coupled to the coupling terminal Pcp.

Similarly, in the mode for outputting a detected signal communicated from the end portion 311 side to the end portion 312 side of the sub-line 31 from the coupling terminal Pcp (which corresponds to the mode (1-4) of the first embodiment), the end portions 321 and 322 of the sub-line 32 are coupled, but detailed descriptions and illustrations thereof are omitted.

As a result, the directional coupler 10B can reduce transfer loss of the main line 20, while constantly reaching a desired value or greater with respect to the degree of coupling over a wide frequency band.

In the mode (3-2), the sub-line 32 with ends shorted is not coupled to the coupling terminal Pcp. With this configuration, the directional coupler 10B can inhibit adverse effects caused because the coupling terminal Pcp is coupled to the sub-line 32 with ends shorted, such as power leakage to the coupling terminal Pcp, and adverse effects caused by other circuits coupled to the coupling terminal Pcp, and thus, desired characteristics are easily achieved. Further, in the mode (3-2), the sub-line 32 with ends shorted is not coupled to the coupling terminal Pcp, and thus, impedance matching between the sub-line 31 outputting a detected signal and the coupling terminal Pcp is more effectively provided.

Fourth Embodiment

Figure 14:
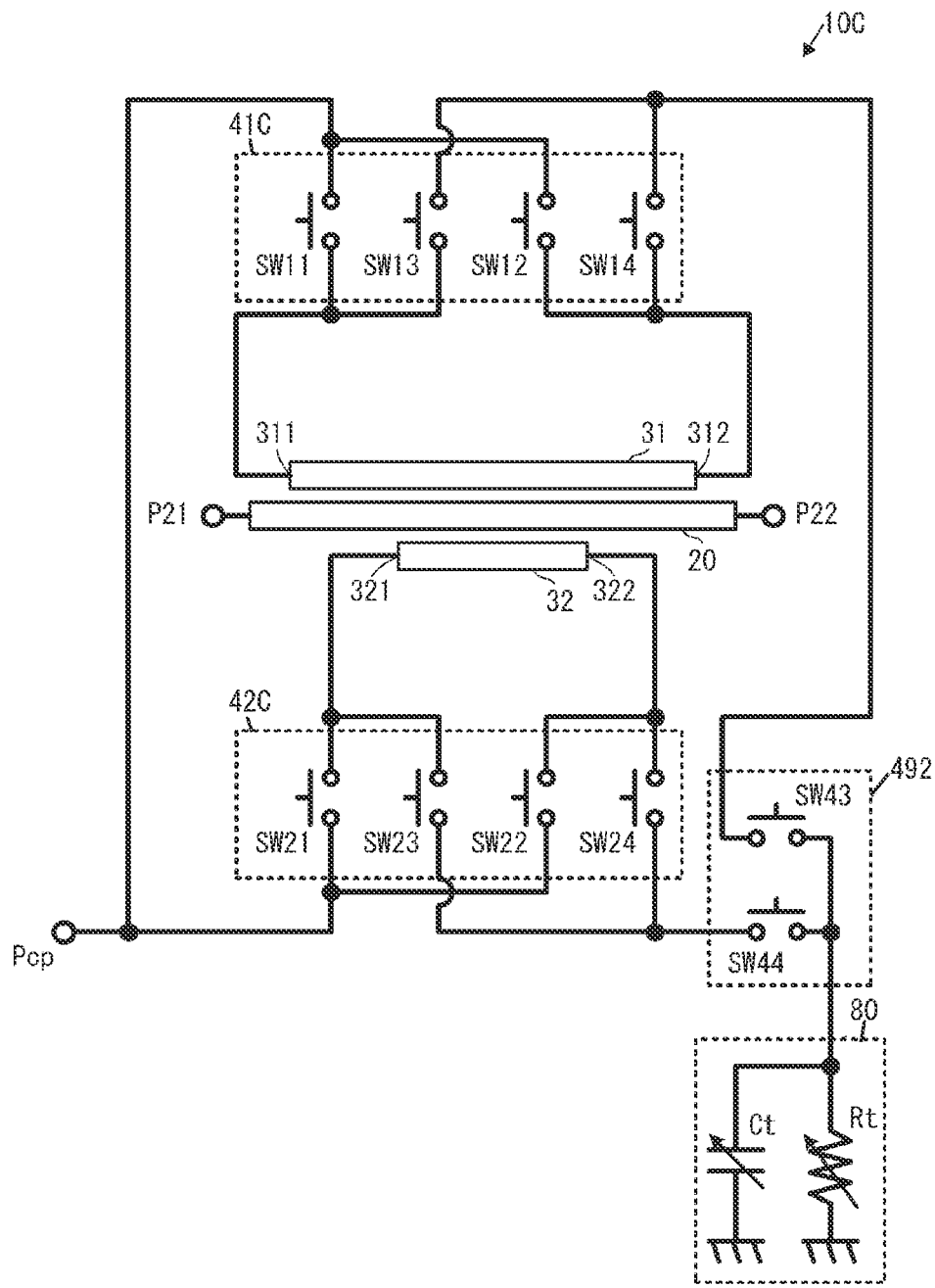
FIG. 14 is a configuration diagram of a directional coupler according to a fourth embodiment.

A directional coupler according to a fourth embodiment of the present invention will be described with reference to the drawings. FIG. 14 is a configuration diagram of the directional coupler according to the fourth embodiment.

A directional coupler 10C according to the fourth embodiment differs from the directional coupler 10A according to the second embodiment in that a switching circuit 492 is added to the directional coupler 10C. Other configurations of the directional coupler 10C are the same as the directional coupler 10A, and descriptions of the same configurations are not repeated.

The switching circuit 492 is coupled between switching circuits 41C and 42C and the termination circuit 80. The switching circuit 41C is configured in the same manner as the switching circuit 41A. The switching circuit 42C is configured in the same manner as the switching circuit 42A. The switching circuit 492 functions as a part of the "second switching circuit" of the present invention.

More specifically, the switching circuit 492 includes switches SW43 and SW44. When the sub-line 31 is the "first sub-line", the switch SW43 corresponds to a "sixth switch" of the present invention. When the sub-line 32 is the "first sub-line", the switch SW44 corresponds to the "sixth switch" of the present invention.

The switch SW43 is coupled between the switches SW13 and SW14 of the switching circuit 41C and the termination circuit 80. The switch SW43 switches connection of the switches SW13 and SW14 and the termination circuit 80 between the shorted state and the open state. The switch SW44 is coupled between the switches SW23 and SW24 of the switching circuit 42C and the termination circuit 80. The switch SW44 switches connection of the switches SW23 and SW24 and the termination circuit 80 between the shorted state and the open state.

Figure 15:
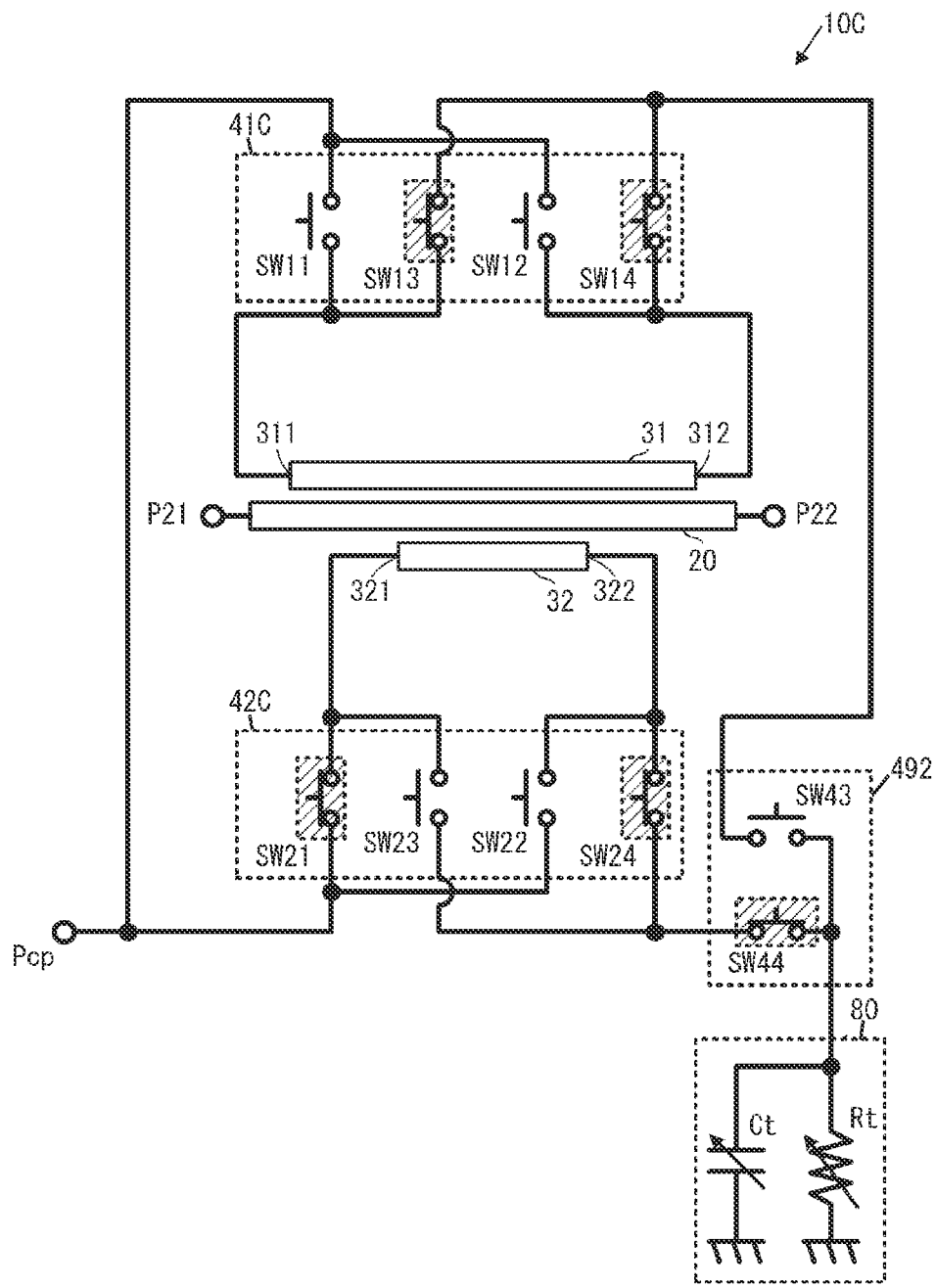
FIG. 15 is a state diagram illustrating a first connection configuration of the directional coupler according to the fourth embodiment.

(4-1) Configuration for Outputting Detected Signal Communicated from End Portion 322 Side to End Portion 321 Side of Sub-Line 32 from Coupling Terminal Pcp FIG. 15 is a state diagram illustrating a first connection configuration of the directional coupler according to the fourth embodiment.

As illustrated in FIG. 15, the switches SW21 and SW24 of the switching circuit 42C are in the shorted state. The switches SW22 and SW23 of the switching circuit 42C are in the open state. As a result, the end portion 321 of the sub-line 32 is coupled to the coupling terminal Pcp but not coupled to the switch SW44 of the switching circuit 492. The end portion 322 of the sub-line 32 is coupled to the switch SW44 of the switching circuit 492 but not coupled to the coupling terminal Pcp.

The switch SW44 of the switching circuit 492 is in the shorted state. As a result, the end portion 322 of the sub-line 32 is coupled to the termination circuit 80 via the switches SW24 and SW44.

With this configuration, the directional coupler 10C outputs from the coupling terminal Pcp a detected signal induced in the sub-line 32 and communicated from the end portion 322 side to the end portion 321 side.

The switches SW13 and SW14 of the switching circuit 41C are in the shorted state.

With this configuration, the end portions 311 and 312 of the sub-line 31 are coupled. This means that a circuit similar to the circuit in which the switch SW91 is in the shorted state in the first embodiment (which corresponds to the mode (1-1) of the first embodiment) is formed.

The switch SW43 of the switching circuit 492 is in the open state. As a result, the switches SW13 and SW14 of the switching circuit 41C and also the sub-line 31 are not coupled to the termination circuit 80.

Also, the switches SW11 and SW12 of the switching circuit 41C are in the open state. As a result, the sub-line 31 is not coupled to the coupling terminal Pcp.

Similarly, in the mode for outputting a detected signal communicated from the end portion 321 side to the end portion 322 side of the sub-line 32 from the coupling terminal Pcp (which corresponds to the mode (1-2) of the first embodiment), the end portions 311 and 312 of the sub-line 31 are coupled, but detailed descriptions and illustrations thereof are omitted.

As a result, the directional coupler 10C can reduce transfer loss of the main line 20, while constantly reaching a desired value or greater with respect to the degree of coupling over a wide frequency band.

In the mode (4-1), the sub-line 31 with ends shorted is not coupled to the termination circuit 80. With this configuration, the directional coupler 10C can inhibit adverse effects caused because the termination circuit 80 is coupled to the sub-line 31 with ends shorted, such as power leakage to the termination circuit 80, and thus, desired characteristics are easily achieved.

Figure 16:
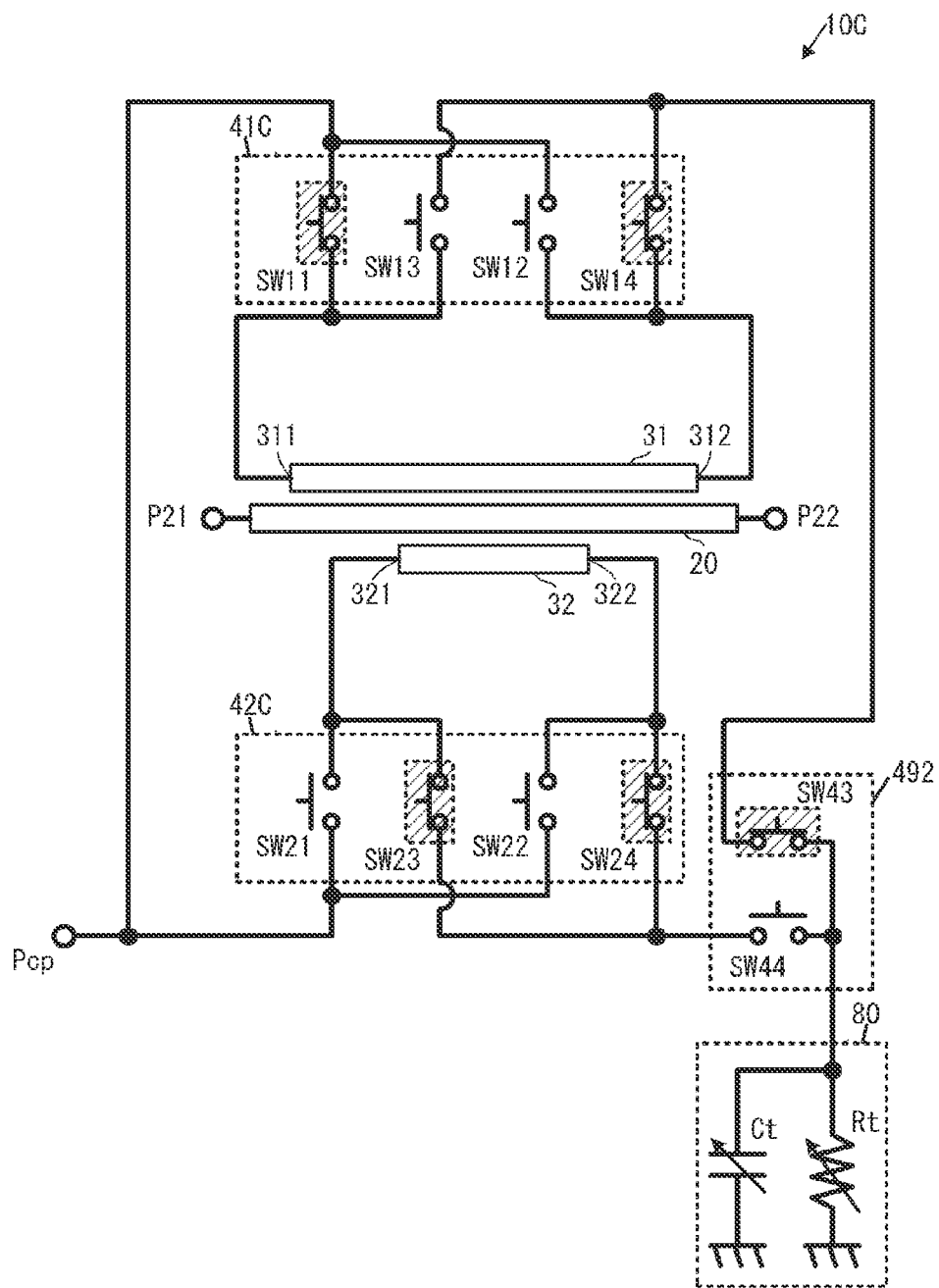
FIG. 16 is a state diagram illustrating a second connection configuration of the directional coupler according to the fourth embodiment.

(4-2) Configuration for Outputting Detected Signal Communicated from End Portion 312 Side to End Portion 311 Side of Sub-Line 31 from Coupling Terminal Pcp FIG. 16 is a state diagram illustrating a second connection configuration of the directional coupler according to the fourth embodiment.

As illustrated in FIG. 16, the switches SW11 and SW14 of the switching circuit 41C are in the shorted state. The switches SW12 and SW13 of the switching circuit 41C are in the open state. As a result, the end portion 311 of the sub-line 31 is coupled to the coupling terminal Pcp but not coupled to the termination circuit 80. The end portion 312 of the sub-line 31 is coupled to the switch SW43 of the switching circuit 492 but not coupled to the coupling terminal Pcp.

The switch SW43 of the switching circuit 492 is in the shorted state. As a result, the end portion 312 of the sub-line 31 is coupled to the termination circuit 80 via the switches SW14 and SW43.

With this configuration, the directional coupler 10C outputs from the coupling terminal Pcp a detected signal induced in the sub-line 31 and communicated from the end portion 312 side to the end portion 311 side.

The switches SW23 and SW24 of the switching circuit 42C are in the shorted state. With this configuration, the end portions 321 and 322 of the sub-line 32 are coupled. This means that a circuit similar to the circuit in which the switch SW92 is in the shorted state in the first embodiment (which corresponds to the mode (1-3) of the first embodiment) is formed.

The switch SW44 of the switching circuit 492 is in the open state. As a result, the switches SW23 and SW24 of the switching circuit 42C and also the sub-line 32 are not coupled to the termination circuit 80.

Also, the switches SW21 and SW22 of the switching circuit 42C are in the open state. As a result, the sub-line 32 is not coupled to the coupling terminal Pcp.

Similarly, in the mode for outputting a detected signal communicated from the end portion 311 side to the end portion 312 side of the sub-line 31 from the coupling terminal Pcp (which corresponds to the mode (1-4) of the first embodiment), the end portions 321 and 322 of the sub-line 32 are coupled, but detailed descriptions and illustrations thereof are omitted.

As a result, the directional coupler 10C can reduce transfer loss of the main line 20, while constantly reaching a desired value or greater with respect to the degree of coupling over a wide frequency band.

In the mode (4-2), the sub-line 32 with ends shorted is not coupled to the termination circuit 80. With this configuration, the directional coupler 10C can inhibit adverse effects caused because the termination circuit 80 is coupled to the sub-line 32 with ends shorted, such as power leakage to the termination circuit 80, and thus, desired characteristics are easily achieved. Further, in the mode (4-2), the sub-line 32 with ends shorted is not coupled to the coupling terminal Pcp, and thus, impedance matching between the sub-line 31 outputting a detected signal and the coupling terminal Pcp is more effectively provided.

Fifth Embodiment

Figure 17:
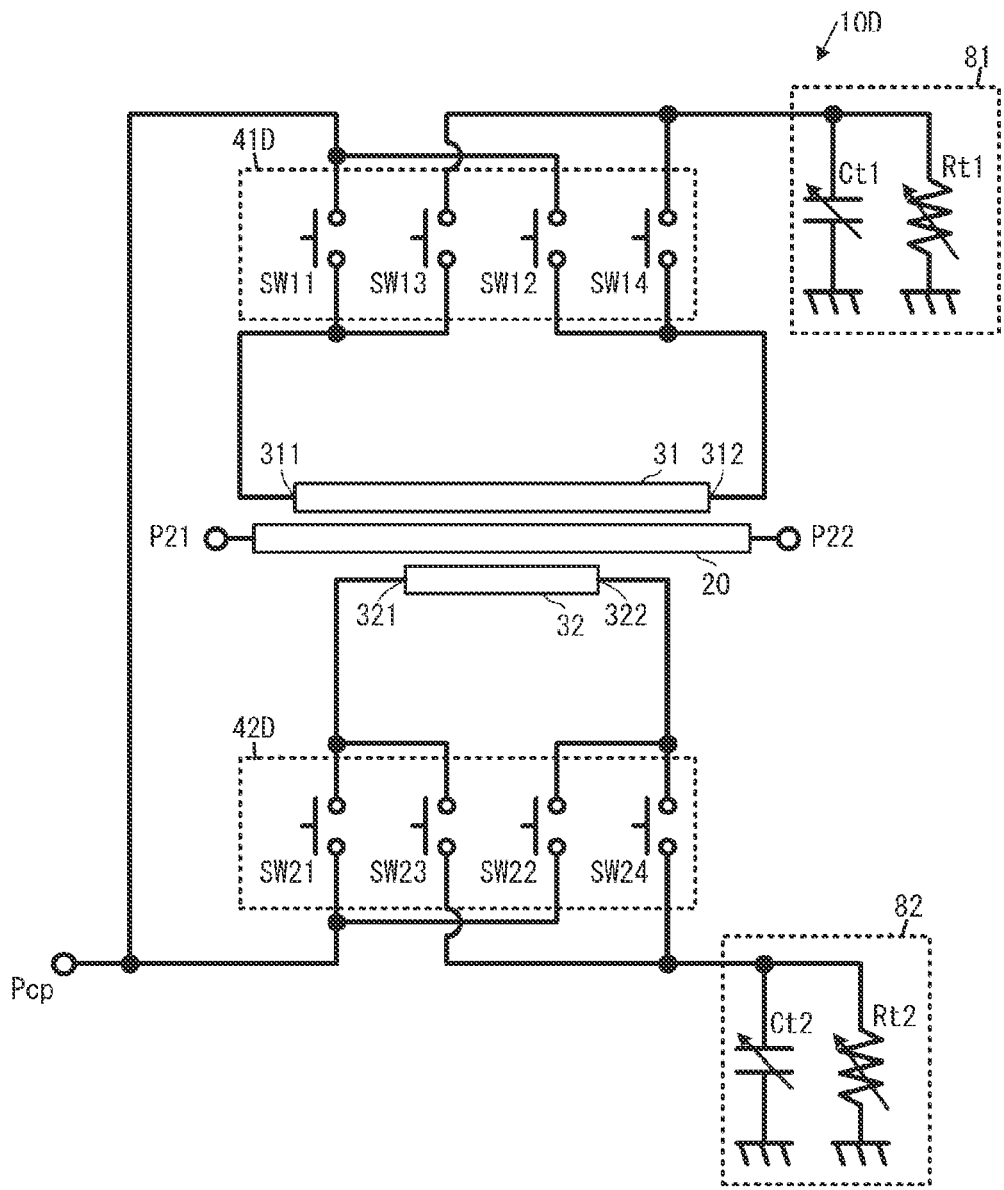
FIG. 17 is a configuration diagram of a directional coupler according to a fifth embodiment.

A directional coupler according to a fifth embodiment of the present invention will be described with reference to the drawings. FIG. 17 is a configuration diagram of the directional coupler according to the fifth embodiment.

A directional coupler 10D according to the fifth embodiment differs from the directional coupler 10C according to the fourth embodiment in that the switching circuit 492 including the switches SW43 and SW44, which correspond to the "sixth switch" of the present invention, is removed, and termination circuits are provided for the respective sub-lines. Other configurations of the directional coupler 10D are the same as the directional coupler 10C, and descriptions of the same configurations are not repeated.

As illustrated in FIG. 17, the directional coupler 10D includes switching circuits 41D and 42D and termination circuits 81 and 82. The switching circuit 41D is configured in the same manner as the switching circuit 41C. The switching circuit 42D is configured in the same manner as the switching circuit 42C.

The termination circuit 81 is coupled to the switching circuit 41D. More specifically, the termination circuit 81 is coupled to the switches SW13 and SW14 of the switching circuit 41D. The termination circuit 81 includes a variable resistor Rt1 and a variable capacitor Ct1. A parallel circuit of the variable resistor Rt1 and the variable capacitor Ct1 couples the switches SW13 and SW14 to a reference potential. The termination circuit 81 is configured to achieve impedance matching in a frequency band of radio-frequency signal detected in the sub-line 31.

The termination circuit 82 is coupled to the switching circuit 42D. More specifically, the termination circuit 82 is coupled to the switches SW23 and SW24 of the switching circuit 42D. The termination circuit 82 includes a variable resistor Rt2 and a variable capacitor Ct2. A parallel circuit of the variable resistor Rt2 and the variable capacitor Ct2 couples the switches SW23 and SW24 to a reference potential. The termination circuit 82 is configured to achieve impedance matching in a frequency band of radio-frequency signal detected in the sub-line 32.

Figure 18:
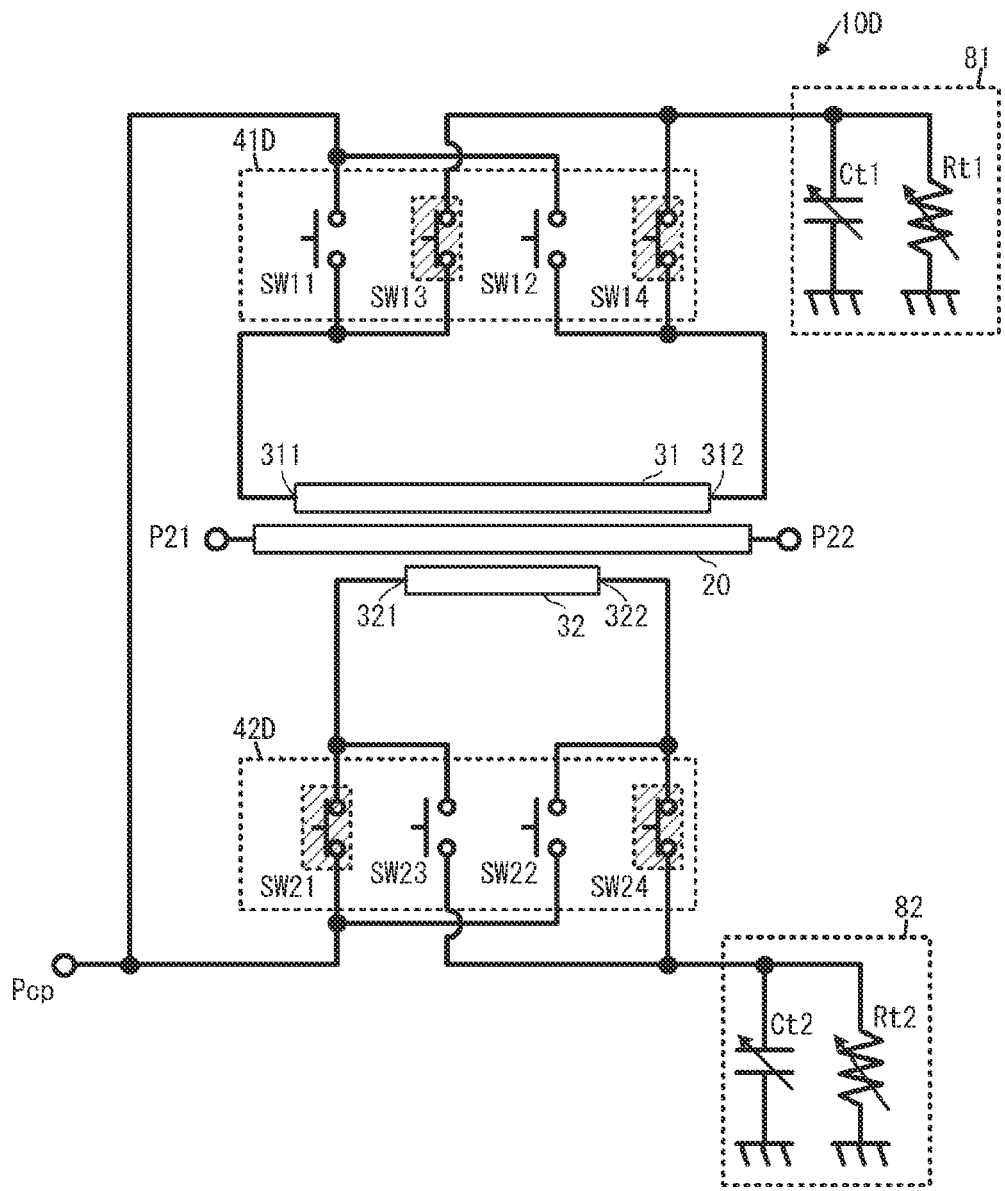
FIG. 18 is a state diagram illustrating a first connection configuration of the directional coupler according to the fifth embodiment.

(5-1) Configuration for Outputting Detected Signal Communicated from End Portion 322 Side to End Portion 321 Side of Sub-Line 32 from Coupling Terminal Pcp FIG. 18 is a state diagram illustrating a first connection configuration of the directional coupler according to the fifth embodiment.

As illustrated in FIG. 18, the switches SW21 and SW24 of the switching circuit 42D are in the shorted state. The switches SW22 and SW23 of the switching circuit 42D are in the open state. As a result, the end portion 321 of the sub-line 32 is coupled to the coupling terminal Pcp but not coupled to the termination circuit 82. The end portion 322 of the sub-line 32 is coupled to the termination circuit 82 but not coupled to the coupling terminal Pcp.

With this configuration, the directional coupler 10D outputs from the coupling terminal Pcp a detected signal induced in the sub-line 32 and communicated from the end portion 322 side to the end portion 321 side.

The switches SW13 and SW14 of the switching circuit 41D are in the shorted state.

With this configuration, the end portions 311 and 312 of the sub-line 31 are coupled. This means that a circuit similar to the circuit in which the switch SW91 is in the shorted state in the first embodiment (which corresponds to the mode (1-1) of the first embodiment) is formed.

Similarly, in the mode for outputting a detected signal communicated from the end portion 321 side to the end portion 322 side of the sub-line 32 from the coupling terminal Pcp (which corresponds to the mode (1-2) of the first embodiment), the end portions 311 and 312 of the sub-line 31 are coupled, but detailed descriptions and illustrations thereof are omitted.

As a result, the directional coupler 10D can reduce transfer loss of the main line 20, while constantly reaching a desired value or greater with respect to the degree of coupling over a wide frequency band.

In the mode (5-1), the sub-line 31 with ends shorted is not coupled to the circuit on the sub-line 32 side. With this configuration, the directional coupler 10D can inhibit adverse effects caused because the circuit on the sub-line 32 side is coupled to the sub-line 31 with ends shorted, and thus, desired characteristics are easily achieved.

Further, because the termination circuit 82 handling only the sub-line 32 is provided, it is possible to more effectively provide impedance matching of detected signals in the sub-line 32 without increasing the circuit size.

Figure 19:
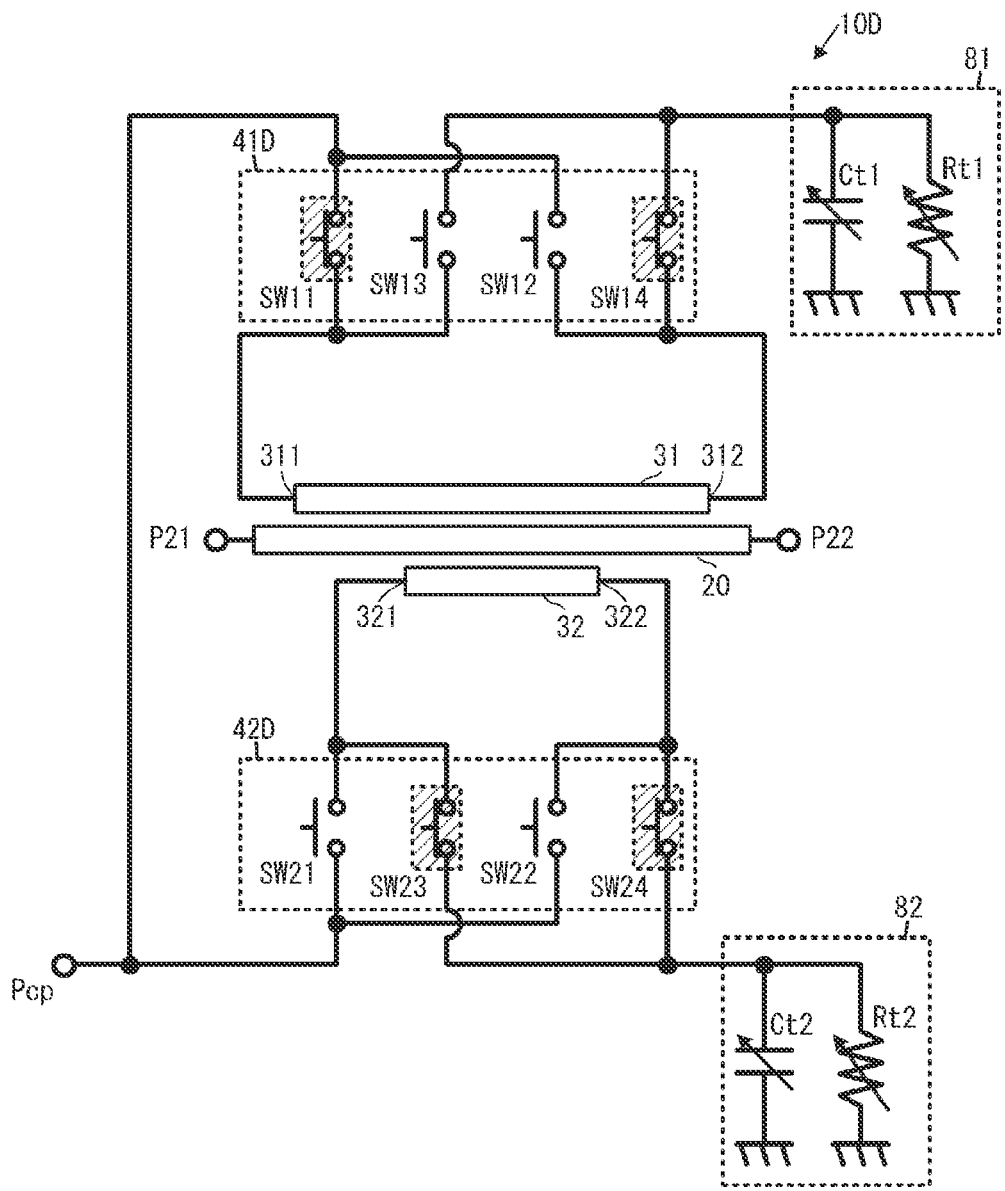
FIG. 19 is a state diagram illustrating a second connection configuration of the directional coupler according to the fifth embodiment.

(5-2) Configuration for Outputting Detected Signal Communicated from End Portion 312 Side to End Portion 311 Side of Sub-Line 31 from Coupling Terminal Pcp FIG. 19 is a state diagram illustrating a second connection configuration of the directional coupler according to the fifth embodiment.

As illustrated in FIG. 19, the switches SW11 and SW14 of the switching circuit 41D are in the shorted state. The switches SW12 and SW13 of the switching circuit 41D are in the open state. As a result, the end portion 311 of the sub-line 31 is coupled to the coupling terminal Pcp but not coupled to the termination circuit 81. The end portion 312 of the sub-line 31 is coupled to the termination circuit 81 but not coupled to the coupling terminal Pcp.

With this configuration, the directional coupler 10D outputs from the coupling terminal Pcp a detected signal induced in the sub-line 31 and communicated from the end portion 312 side to the end portion 311 side.

The switches SW23 and SW24 of the switching circuit 42D are in the shorted state. With this configuration, the end portions 321 and 322 of the sub-line 32 are coupled. This means that a circuit similar to the circuit in which the switch SW92 is in the shorted state in the first embodiment (which corresponds to the mode (1-3) of the first embodiment) is formed.

Also, the switches SW21 and SW22 of the switching circuit 42D are in the open state. As a result, the sub-line 32 is not coupled to the coupling terminal Pcp.

Similarly, in the mode for outputting a detected signal communicated from the end portion 311 side to the end portion 312 side of the sub-line 31 from the coupling terminal Pcp (which corresponds to the mode (1-4) of the first embodiment), the end portions 321 and 322 of the sub-line 32 are coupled, but detailed descriptions and illustrations thereof are omitted.

As a result, the directional coupler 10D can reduce transfer loss of the main line 20, while constantly reaching close to a desired value with respect to the degree of coupling over a wide frequency band.

In the mode (5-2), the sub-line 32 with ends shorted is not coupled to the circuit on the sub-line 31 side. With this configuration, the directional coupler 10D can inhibit adverse effects caused because the circuit on the sub-line 31 side is coupled to the sub-line 32 with ends shorted, and thus, desired characteristics are easily achieved.

Further, because the termination circuit 81 handling only the sub-line 31 is provided, it is possible to more effectively provide impedance matching of detected signals in the sub-line 31 without increasing the circuit size.

Further, the directional coupler 10D includes the termination circuit 81 for the sub-line 31 and the termination circuit 82 for the sub-line 32 in an individual manner. With this configuration, impedance matching can be provided individually for the frequency band detected in the sub-line 31 and the frequency band detected in the sub-line 32. As a result, without increasing the circuit size, the directional coupler 10D can output detected signals of a wide frequency band with lower loss. Furthermore, with this configuration, the directional coupler 10D inhibits adverse effects of the sub-lines 31 and 32 on the main line 20 effectively in an individual manner, thereby further suppressing degradation of the transfer characteristic of the main line 20.

Sixth Embodiment

Figure 20:
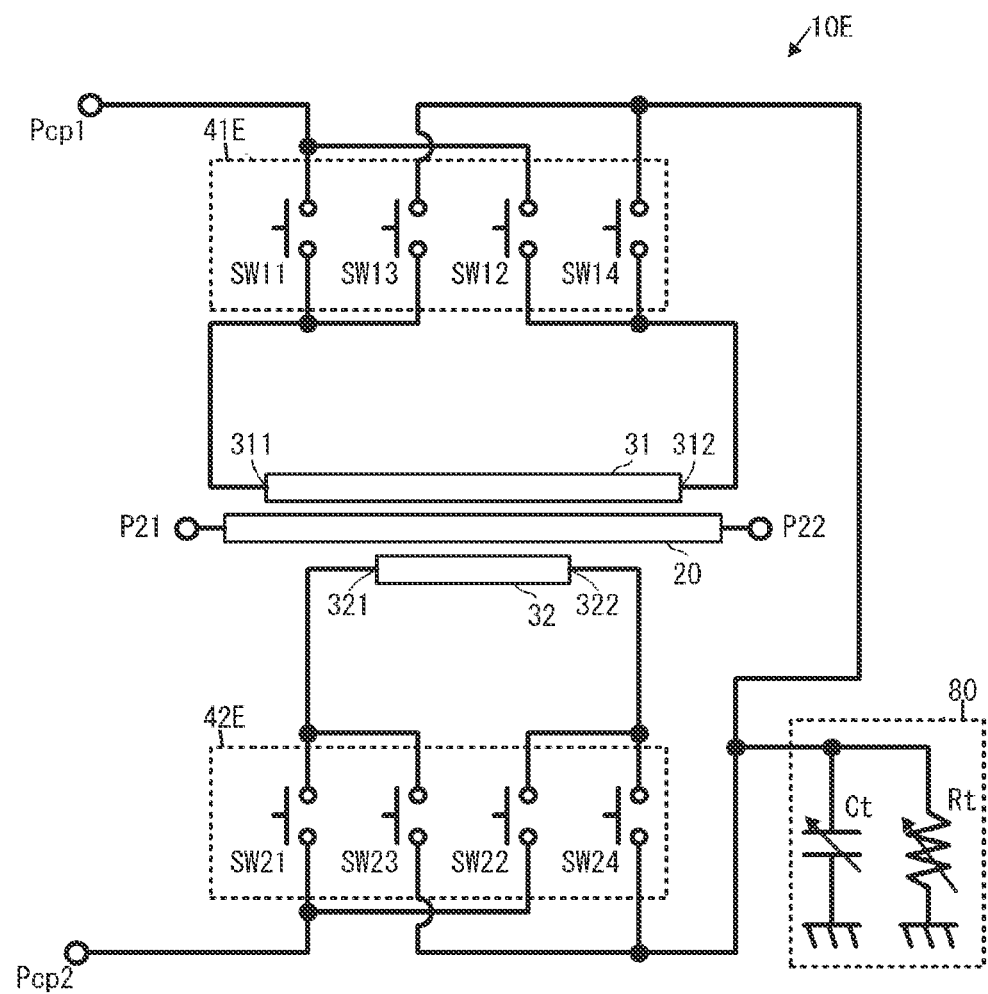
FIG. 20 is a configuration diagram of a directional coupler according to a sixth embodiment.

A directional coupler according to a sixth embodiment of the present invention will be described with reference to the drawings. FIG. 20 is a configuration diagram of the directional coupler according to the sixth embodiment.

A directional coupler 10E according to the sixth embodiment differs from the directional coupler 10A according to the second embodiment in that a coupling terminal is provided for each sub-line.

Other configurations of the directional coupler 10E are the same as the directional coupler 10A, and descriptions of the same configurations are not repeated.

As illustrated in FIG. 20, the directional coupler 10E includes switching circuits 41E and 42E and coupling terminals Pcp1 and Pcp2.

The switching circuit 41E is configured in the same manner as the switching circuit 41A. The switching circuit 42E is configured in the same manner as the switching circuit 42A. In the directional coupler 10E, no switch corresponds to the "fifth switch" of the present invention.

The coupling terminal Pcp1 is coupled to the switching circuit 41E. More specifically, the coupling terminal Pcp1 is coupled to the switches SW11 and SW12.

The coupling terminal Pcp2 is coupled to the switching circuit 42E. More specifically, the coupling terminal Pcp2 is coupled to the switches SW21 and SW22.

The coupling terminal Pcp2 is coupled to the switching circuit 42E. More specifically, the coupling terminal Pcp2 is coupled to the switches SW21 and W22.

(6-1) Configuration for Outputting Detected Signal Communicated from End Portion 322 Side to End Portion 321 Side of Sub-Line 32 from Coupling Terminal Pcp2

Figure 21:
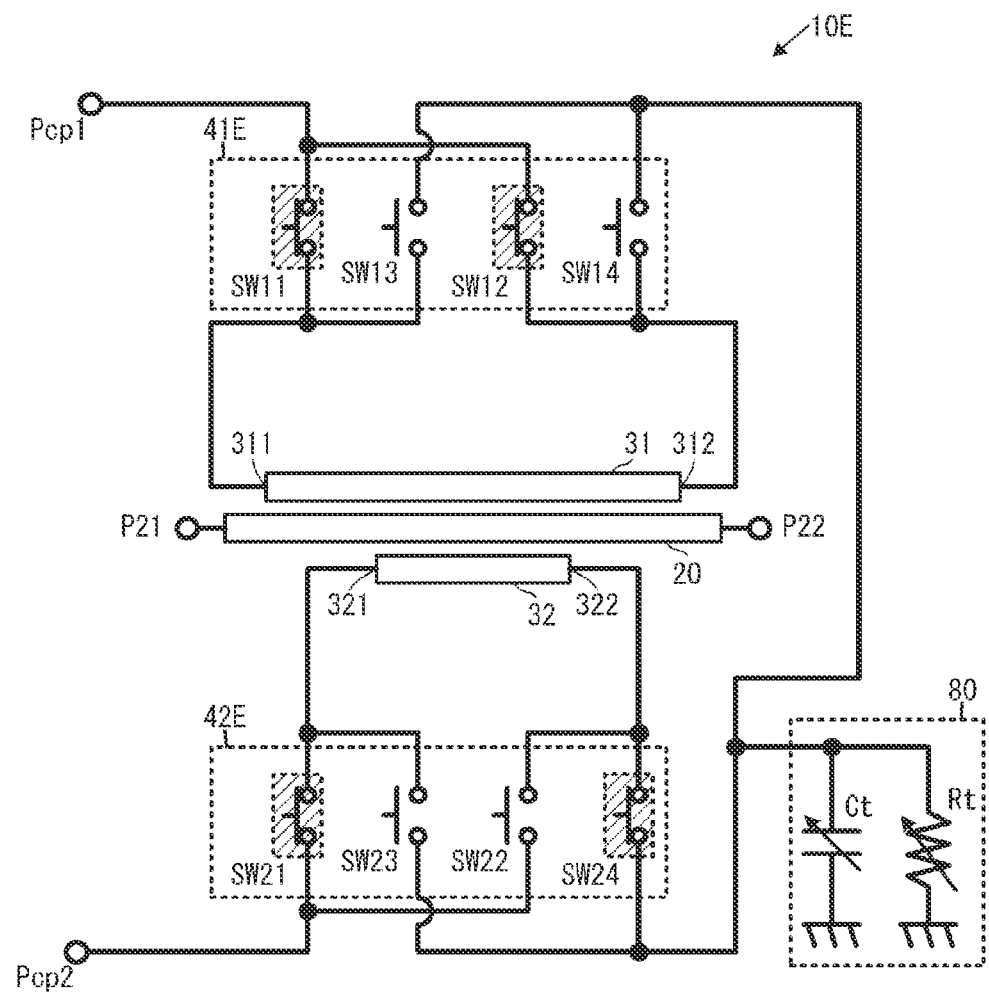
FIG. 21 is a state diagram illustrating a first connection configuration of the directional coupler according to the sixth embodiment.

FIG. 21 is a state diagram illustrating a first connection configuration of the directional coupler according to the sixth embodiment.

As illustrated in FIG. 21, the switches SW21 and SW24 of the switching circuit 42E are in the shorted state. The switches SW22 and SW23 of the switching circuit 42E are in the open state. As a result, the end portion 321 of the sub-line 32 is coupled to the coupling terminal Pcp2 but not coupled to the termination circuit 80. The end portion 322 of the sub-line 32 is coupled to the termination circuit 80 but not coupled to the coupling terminal Pcp2.

With this configuration, the directional coupler 10E outputs from the coupling terminal Pcp2 a detected signal induced in the sub-line 32 and communicated from the end portion 322 side to the end portion 321 side.

The switches SW11 and SW12 of the switching circuit 41E are in the shorted state.

With this configuration, the end portions 311 and 312 of the sub-line 31 are coupled. This means that a circuit similar to the circuit in which the switch SW91 is in the shorted state in the first embodiment (which corresponds to the mode (1-1) of the first embodiment) is formed.

Similarly, in the mode for outputting a detected signal communicated from the end portion 321 side to the end portion 322 side of the sub-line 32 from the coupling terminal Pcp2 (which corresponds to the mode (1-2) of the first embodiment), the end portions 311 and 312 of the sub-line 31 are coupled, but detailed descriptions and illustrations thereof are omitted.

As a result, the directional coupler 10E can reduce transfer loss of the main line 20, while constantly reaching a desired value or greater with respect to the degree of coupling over a wide frequency band.

In the mode (6-1), the sub-line 31 with ends shorted is not coupled to the circuit on the sub-line 32 side. With this configuration, the directional coupler 10E can inhibit adverse effects caused because the circuit on the sub-line 32 side is coupled to the sub-line 31 with ends shorted, and thus, desired characteristics are easily achieved.

(6-2) Configuration for Outputting Detected Signal Communicated from the End Portion 312 Side to the End Portion 311 Side of the Sub-Line 31 from Coupling Terminal Pcp1

Figure 22:
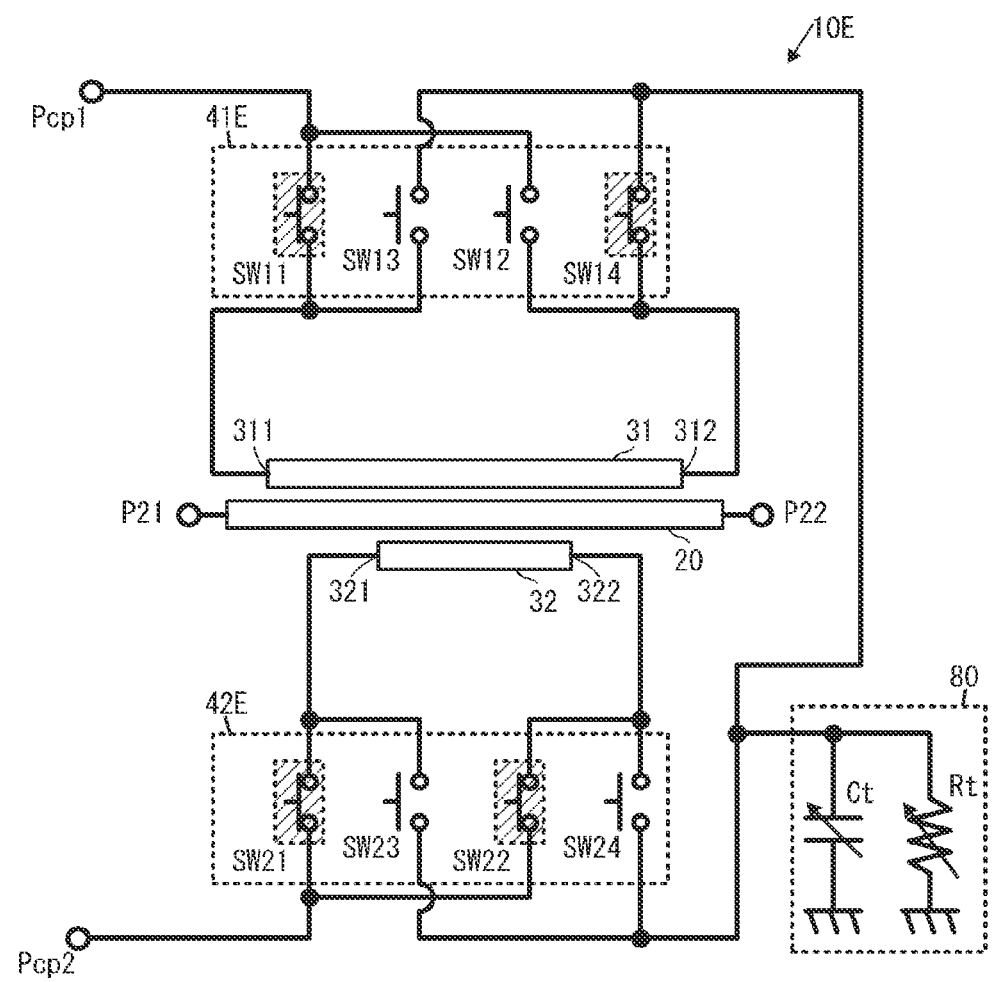
FIG. 22 is a state diagram illustrating a second connection configuration of the directional coupler according to the sixth embodiment.

FIG. 22 is a state diagram illustrating a second connection configuration of the directional coupler according to the sixth embodiment.

As illustrated in FIG. 22, the switches SW11 and SW14 of the switching circuit 41E are in the shorted state. The switches SW12 and SW13 of the switching circuit 41E are in the open state. As a result, the end portion 311 of the sub-line 31 is coupled to the coupling terminal Pcp1 but not coupled to the termination circuit 80. The end portion 312 of the sub-line 31 is coupled to the termination circuit 80 but not coupled to the coupling terminal Pcp1.

With this configuration, the directional coupler 10E outputs from the coupling terminal Pcp1 a detected signal induced in the sub-line 31 and communicated from the end portion 312 side to the end portion 311 side.

The switches SW21 and SW22 of the switching circuit 42E are in the shorted state. With this configuration, the end portions 321 and 322 of the sub-line 32 are coupled. This means that a circuit similar to the circuit in which the switch SW92 is in the shorted state in the first embodiment (which corresponds to the mode (1-3) of the first embodiment) is formed.

Also, the switches SW23 and SW24 of the switching circuit 42E are in the open state. As a result, the sub-line 32 is not coupled to the termination circuit 80.

Similarly, in the mode for outputting a detected signal communicated from the end portion 311 side to the end portion 312 side of the sub-line 31 from the coupling terminal Pcp1 (which corresponds to the mode (1-4) of the first embodiment), the end portions 321 and 322 of the sub-line 32 are coupled, but detailed descriptions and illustrations thereof are omitted.

As a result, the directional coupler 10E can reduce transfer loss of the main line 20, while constantly reaching a desired value or greater with respect to the degree of coupling over a wide frequency band.

In the mode (6-2), the sub-line 32 with ends shorted is not coupled to the circuit on the sub-line 31 side. With this configuration, the directional coupler 10E can inhibit adverse effects caused because the circuit on the sub-line 31 side is coupled to the sub-line 32 with ends shorted, and thus, desired characteristics are easily achieved.

Seventh Embodiment

Figure 23:
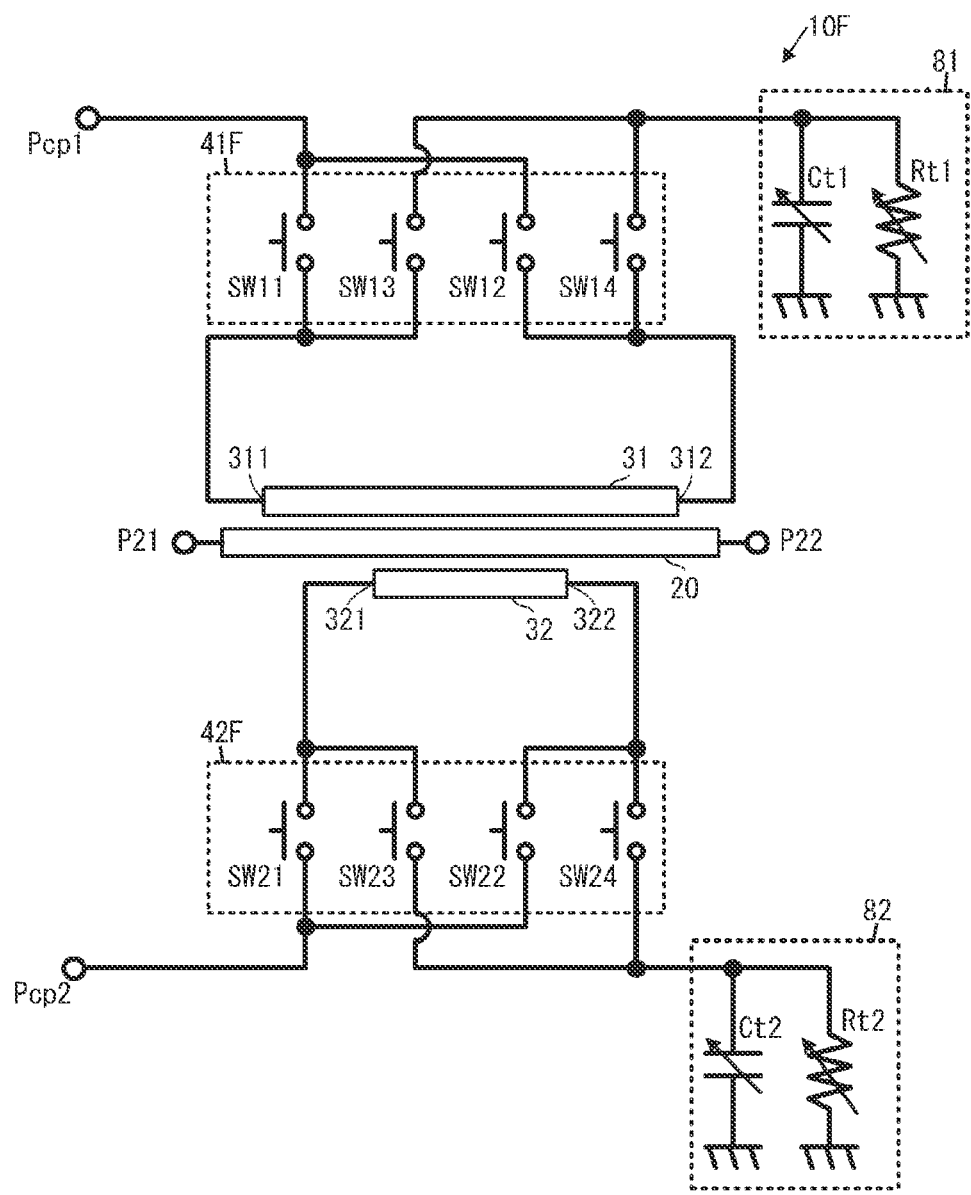
FIG. 23 is a configuration diagram of a directional coupler according to a seventh embodiment.

A directional coupler according to a seventh embodiment of the present invention will be described with reference to the drawings. FIG. 23 is a configuration diagram of the directional coupler according to the seventh embodiment.

A directional coupler 10F according to the seventh embodiment differs from the directional coupler 10D according to the fifth embodiment in that a coupling terminal is provided for each sub-line. This means that the directional coupler 10F has a configuration in which the termination-circuit-side configuration of the directional coupler 10D and the coupling-terminal-side configuration of the directional coupler 10E are combined together. Other configurations of the directional coupler 10F are the same as the directional couplers 10D and 10E, and descriptions of the same configurations are not repeated. Similarly to the directional coupler 10E according to the sixth embodiment, in the directional coupler 10F, no switch corresponds to the "fifth switch" of the present invention.

The directional coupler 10F includes switching circuits 41F and 42F, the coupling terminals Pcp1 and Pcp2, and the termination circuits 81 and 82. The switching circuit 41F is configured in the same manner as the switching circuits 41D and 41E. The switching circuit 42F is configured in the same manner as the switching circuits 42D and 42E.

The coupling terminal Pcp1 and the termination circuit 81 are coupled to the switching circuit 41F. More specifically, the coupling terminal Pcp1 is coupled to the switches SW11 and SW12 of the switching circuit 41F. The termination circuit 81 is coupled to the switches SW13 and SW14 of the switching circuit 41F.

The coupling terminal Pcp2 and the termination circuit 82 are coupled to the switching circuit 42F. More specifically, the coupling terminal Pcp2 is coupled to the switches SW21 and SW22 of the switching circuit 42F. The termination circuit 82 is coupled to the switches SW23 and SW24 of the switching circuit 42F.

With this configuration, the directional coupler 10F can reduce transfer loss of the main line 20, while constantly reaching close to a desired value with respect to the degree of coupling over a wide frequency band.

Eighth Embodiment

Figure 24:
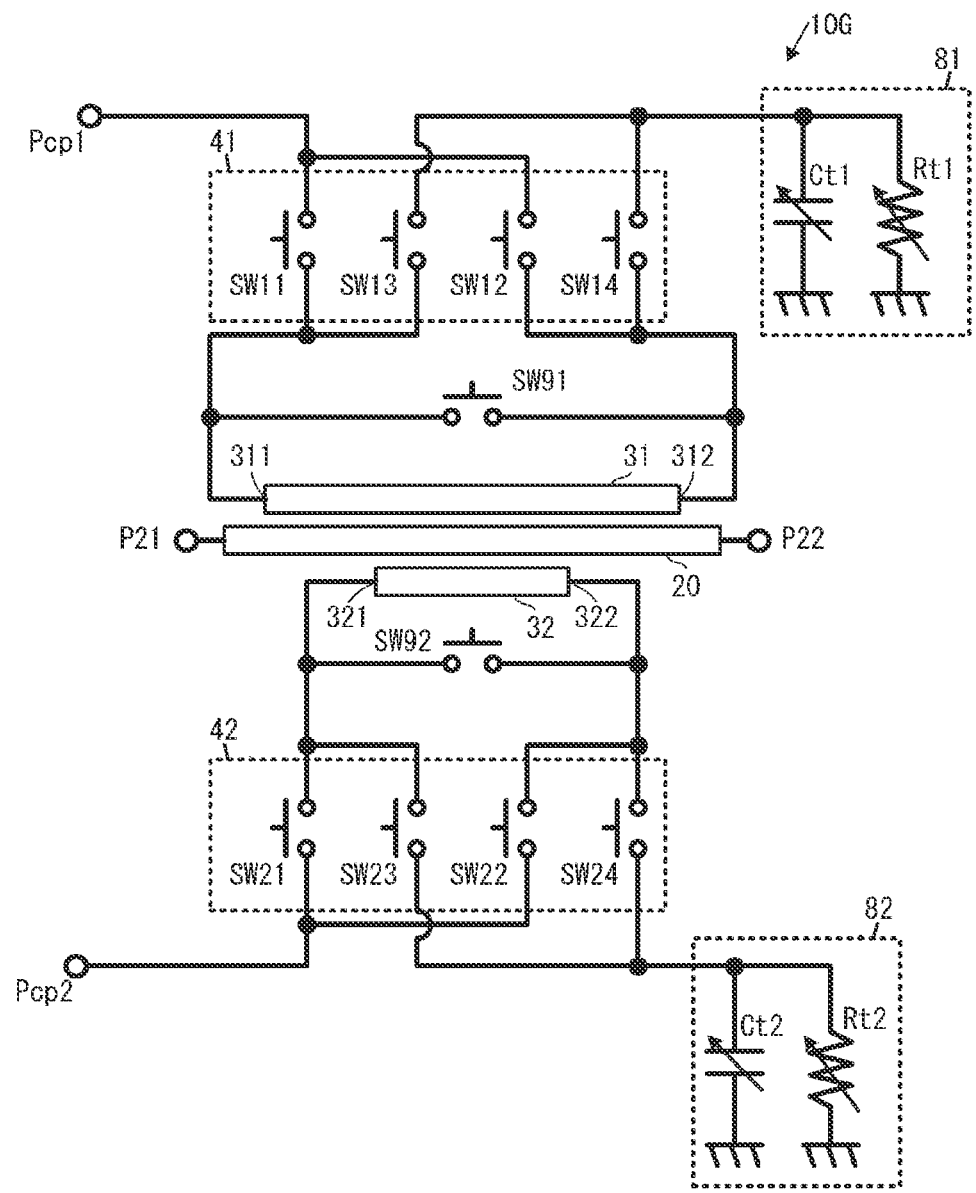
FIG. 24 is a configuration diagram of a directional coupler according to an eighth embodiment.

A directional coupler according to an eighth embodiment of the present invention will be described with reference to the drawings. FIG. 24 is a configuration diagram of the directional coupler according to the eighth embodiment.

A directional coupler 10G according to the eighth embodiment differs from the directional coupler 10 according to the first embodiment in that a coupling terminal and a termination circuit are provided for each sub-line. Other configurations of the directional coupler 10G are the same as the directional coupler 10, and descriptions of the same configurations are not repeated.

The directional coupler 10G includes the coupling terminals Pcp1 and Pcp2 and the termination circuits 81 and 82.

The coupling terminal Pcp1 and the termination circuit 81 are coupled to the switching circuit 41. More specifically, the coupling terminal Pcp1 is coupled to the switches SW11 and SW12 of the switching circuit 41. The termination circuit 81 is coupled to the switches SW13 and SW14 of the switching circuit 41.

The coupling terminal Pcp2 and the termination circuit 82 are coupled to the switching circuit 42. More specifically, the coupling terminal Pcp2 is coupled to the switches SW21 and SW22 of the switching circuit 42. The termination circuit 82 is coupled to the switches SW23 and SW24 of the switching circuit 42.

With this configuration, the directional coupler 10G can reduce transfer loss of the main line 20, while constantly reaching close to a desired value with respect to the degree of coupling over a wide frequency band.

Ninth Embodiment

Figure 25:
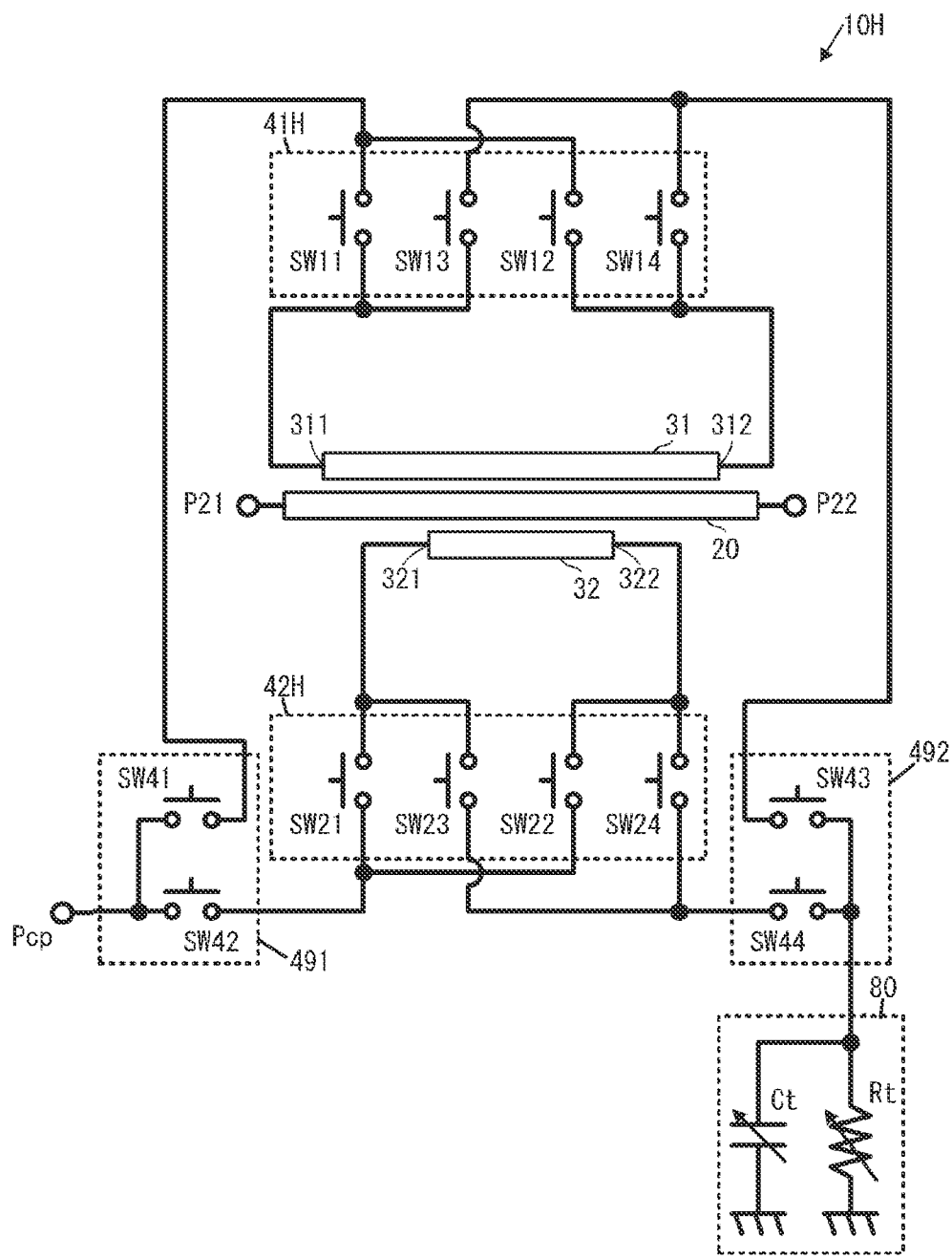
FIG. 25 is a configuration diagram of a directional coupler according to a ninth embodiment.

A directional coupler according to a ninth embodiment of the present invention will be described with reference to the drawings. FIG. 25 is a configuration diagram of the directional coupler according to the ninth embodiment.

A directional coupler 10H according to the ninth embodiment has a configuration in which the directional couplers 10B and 10C according to the third and fourth embodiments are combined together. More specifically, the directional coupler 10H includes the switching circuit 491 of the directional coupler 10B and the switching circuit 492 of the directional coupler 10C. Other configurations of the directional coupler 10H are the same as the directional couplers 10B and 10C, and descriptions of the same configurations are not repeated.

The directional coupler 10H includes switching circuits 41H and 42H and the switching circuits 491 and 492. The switching circuit 41H is configured in the same manner as the switching circuits 41B and 41C. The switching circuit 42H is configured in the same manner as the switching circuits 42B and 42C.

The switching circuit 491 is coupled between the coupling terminal Pcp and the switching circuits 41H and 42H. The switching circuit 492 is coupled between the termination circuit 80 and the switching circuits 41H and 42H.

With this configuration, the directional coupler 10H can reduce transfer loss of the main line 20, while constantly reaching close to a desired value with respect to the degree of coupling over a wide frequency band.

Tenth Embodiment

Figure 26:
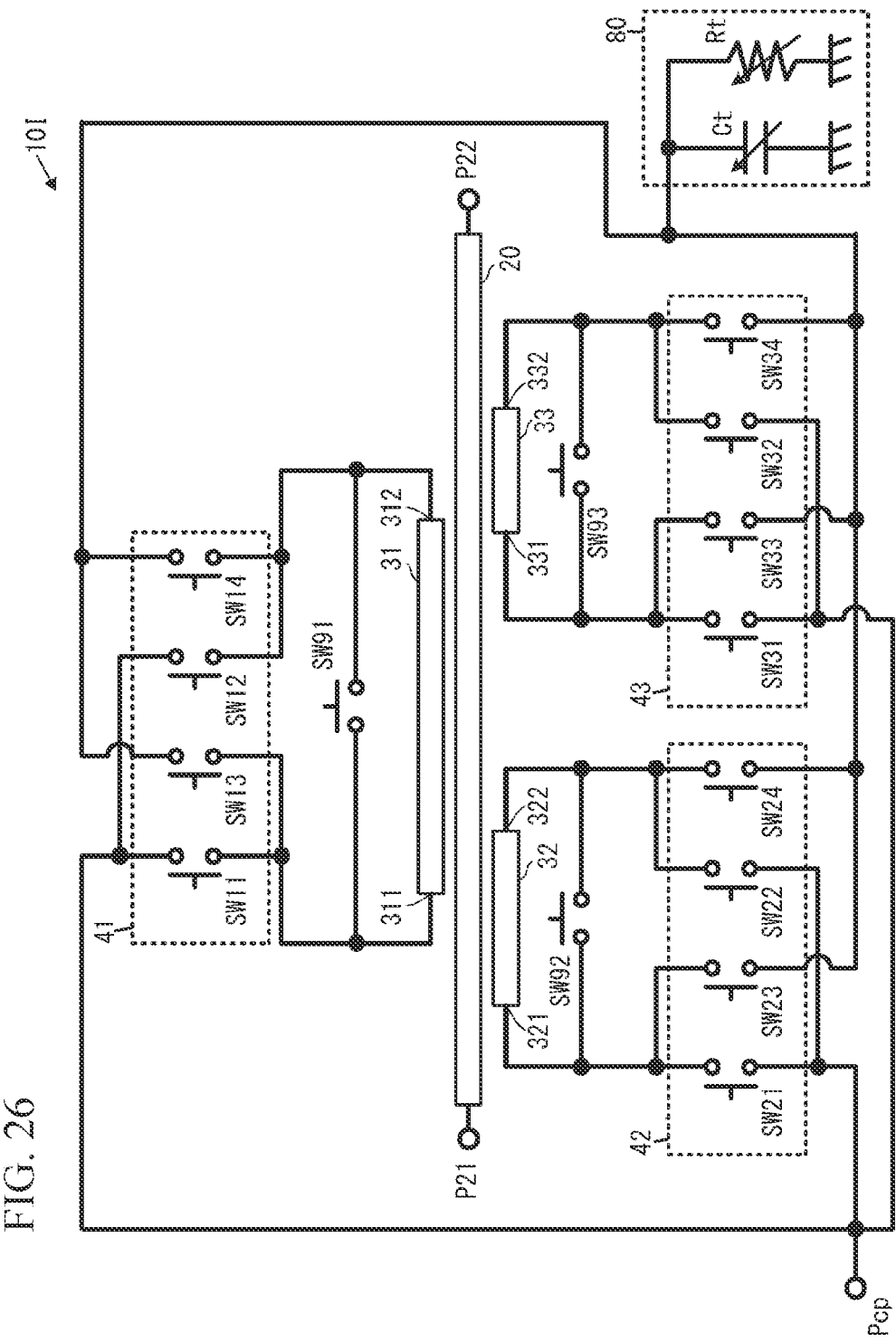
FIG. 26 is a configuration diagram of a directional coupler according to a tenth embodiment.

A directional coupler according to a tenth embodiment of the present invention will be described with reference to the drawings. FIG. 26 is a configuration diagram of the directional coupler according to the tenth embodiment.

As illustrated in FIG. 26, a directional coupler 10I according to the tenth embodiment differs from the directional coupler 10 according to the first embodiment in that three sub-lines are included. Other configurations of the directional coupler 10I are the same as the directional coupler 10, and descriptions of the same configurations are not repeated.

The directional coupler 10I includes a sub-line 33, a switching circuit 43, and a switch SW93.

The sub-line 33 is located at a position that enables the sub-line 33 to be electromagnetically coupled to the main line 20. For example, the sub-line 33 is elongated in the direction along the main line 20, spaced apart by a particular distance from the main line 20. At this time, the shape of the sub-line 33 and the position of the sub-line 33 relative to the main line 20 are determined such that a desired degree of coupling with the main line 20 is achieved in a third frequency band.

The third frequency band does not completely coincide with the first and second frequency bands. In other words, the third frequency band is different from the second frequency band and the first frequency band. The third frequency band is, for example, a frequency band higher than the first frequency band and the second frequency band. The third frequency band may be a frequency band including 3.3 GHZ and higher.

The sub-line 33 has an end portion 331 at one end in the length direction and an end portion 332 at the other end in the length direction. Two of the sub-lines 31, 32, and 33 correspond to the "first sub-line" of the present invention, and the other of the sub-lines 31, 32, and 33 corresponds to the "second sub-line" of the present invention. When the sub-line 31 is the first sub-line, the end portion 311 corresponds to the "first end" of the present invention, and the end portion 312 corresponds to the "second end" of the present invention. When the sub-line 32 is the first sub-line, the end portion 321 corresponds to the "first end" of the present invention, and the end portion 322 corresponds to the "second end" of the present invention. When the sub-line 33 is the first sub-line, the end portion 331 corresponds to the "first end" of the present invention, and the end portion 332 corresponds to the "second end" of the present invention.

The switching circuit 43 includes switches SW31, SW32, SW33, and SW34. The switch SW31 is coupled between the end portion 331 of the sub-line 33 and the coupling terminal Pcp. The switch SW31 switches connection of the end portion 331 and the coupling terminal Pcp between the shorted state and the open state. The switch SW32 is coupled between the end portion 332 of the sub-line 33 and the coupling terminal Pcp. The switch SW32 switches connection of the end portion 332 and the coupling terminal Pcp between the shorted state and the open state. The switch SW33 is coupled between the end portion 331 of the sub-line 33 and the termination circuit 80. The switch SW33 switches connection of the end portion 331 and the termination circuit 80 between the shorted state and the open state. The switch SW34 is coupled between the end portion 332 of the sub-line 33 and the termination circuit 80. The switch SW34 switches connection of the end portion 332 and the termination circuit 80 between the shorted state and the open state. The switching circuit 43 is a part of the "second switching circuit" of the present invention.

A coupling terminal Pcp side of the switch SW31 and a coupling terminal Pcp side of the switch SW32 are coupled. A termination circuit 80 side of the switch SW33 and a termination circuit 80 side of the switch SW34 are coupled. When the sub-line 33 is the "first sub-line", the switches SW31, SW32, SW33, and SW34 respectively correspond to the "first switch", the "second switch", the "third switch", and the "fourth switch" of the present invention.

The switch SW93 is coupled between the end portions 331 and 332 of the sub-line 33. The switch SW93 switches connection of the end portions 331 and 332 between the shorted state and the open state. When the sub-line 33 is the "first sub-line", the switch SW93 corresponds to the "first switching circuit" of the present invention.

Figure 27:
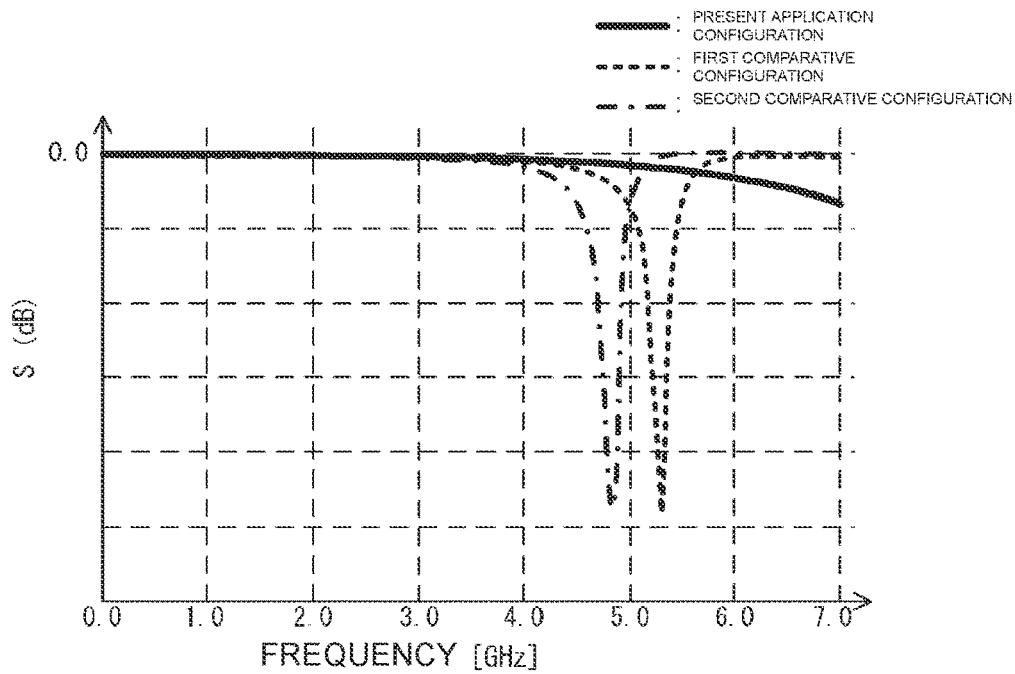
FIG. 27 is a graph illustrating an example of a simulation result of the transfer characteristic of a main line (S21).

FIG. 27 is a graph illustrating an example of a simulation result of the transfer characteristic of the main line (S21). In FIG. 27, a solid line indicates the characteristic of the configuration of the present application, a dashed line indicates the characteristic of the first comparative configuration, and a dot-dash line indicates the characteristic of a second comparative configuration. The first and second comparative configurations indicate configurations in which sub-lines not outputting detected signals are not in the shorted state; the first comparative configuration indicates a configuration with two sub-lines; the second comparative configuration indicates a configuration with three sub-lines.

As illustrated in FIG. 27, as the number of sub-lines increases, the frequency of attenuation pole is shifted to the lower side. For example, in the cases in FIG. 27, the frequency of attenuation pole with two sub-lines is about 5.2 [GHz], whereas the frequency of attenuation pole with three sub-lines is decreased to about 4.8 [GHz]. This means that more adverse effects occur in the frequency band of radio-frequency signals communicated in the main line 20 of the directional coupler 10I.

However, because the directional coupler 10I has the configuration described above, the attenuation pole is shifted to the high frequency side (in the case in FIG. 27, the high frequency side higher than 7.0 [GHz]).

As a result, it is possible to suppress significant degradation of the transfer characteristic of the main line 20 over a wider frequency band and thus achieve a transfer characteristic with low loss. Consequently, the directional coupler 10I can obtain a detected signal in a desired frequency band, while suppressing transfer loss of radio-frequency signals flowing through the main line 20 over an even wider frequency band.

In particular, because three sub-lines are used in the directional coupler 10I, the directional coupler 10I can be used to detect waves of a frequency band wider than when two sub-lines are used. Also in this case, it is possible to obtain detected signals in a desired frequency band, while reducing transfer loss of radio-frequency signals communicated in the main line 20.

Although the case of three sub-lines is presented, the number of sub-lines may be four or more. Also in these cases, one of the sub-lines is used to output a detected signal, and both ends of the other sub-lines are shorted.

Eleventh Embodiment

Figure 28:
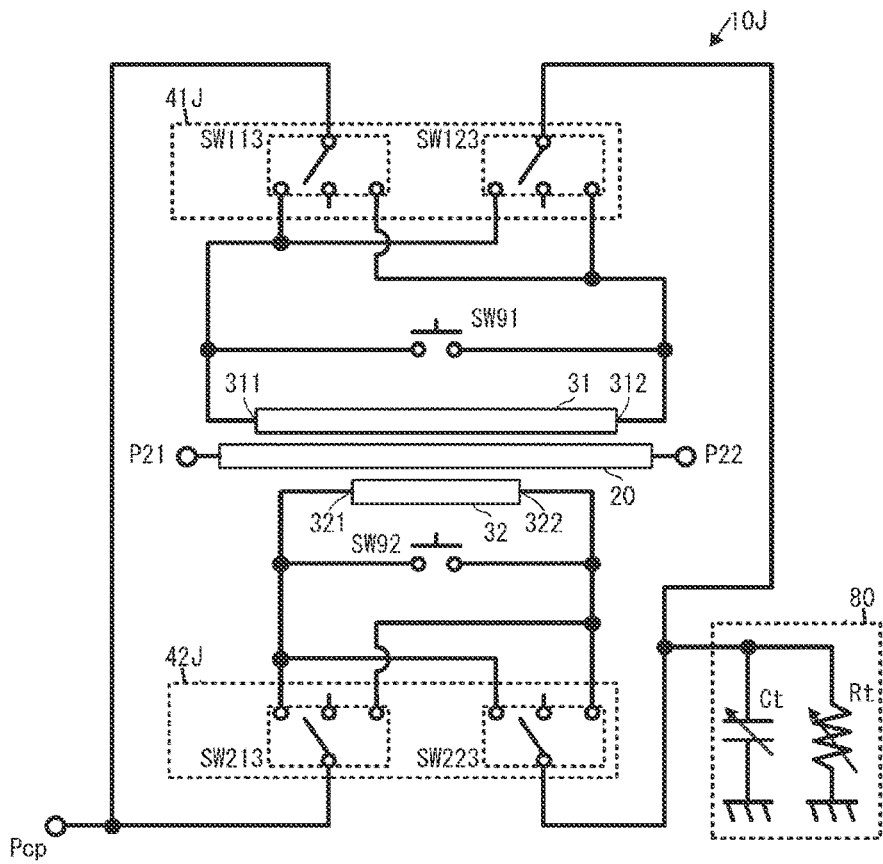
FIG. 28 is a configuration diagram of a directional coupler according to an eleventh embodiment.

A directional coupler according to an eleventh embodiment of the present invention will be described with reference to the drawings. FIG. 28 is a configuration diagram of the directional coupler according to the eleventh embodiment.

As illustrated in FIG. 28, a directional coupler 10J according to the eleventh embodiment differs from the directional coupler 10 according to the first embodiment in that SP3T switches are used. Other configurations of the directional coupler 10J are the same as the directional coupler 10, and descriptions of the same configurations are not repeated.

The directional coupler 10J includes switching circuits 41J and 42J. The switching circuits 41J and 42J correspond to the "second switching circuit" of the present invention.

The switching circuit 41J includes switches SW113 and SW123. The switches SW113 and SW123 are single-pole triple-throw (SP3T) switch elements.

Of the switch SW113, a single-pole-side terminal is coupled to the coupling terminal Pcp; a triple-throw-side terminal is coupled to the end portion 311 of the sub-line 31; another triple-throw-side terminal is coupled to the end portion 312 of the sub-line 31; and the other triple-throw-side terminal is a floating terminal not coupled to anywhere. Of the switch SW123, a single-pole-side terminal is coupled to the termination circuit 80; a triple-throw-side terminal is coupled to the end portion 311 of the sub-line 31; another triple-throw-side terminal is coupled to the end portion 312 of the sub-line 31; and the other triple-throw-side terminal is a floating terminal not coupled to anywhere.

The switching circuit 42J includes switches SW213 and SW223. The switches SW213 and SW223 are single-pole triple-throw (SP3T) switch elements.

Of the switch SW213, a single-pole-side terminal is coupled to the coupling terminal Pcp; a triple-throw-side terminal is coupled to the end portion 321 of the sub-line 32; another triple-throw-side terminal is coupled to the end portion 322 of the sub-line 32; and the other triple-throw-side terminal is a floating terminal not coupled to anywhere. Of the switch SW223, a single-pole-side terminal is coupled to the termination circuit 80; a triple-throw-side terminal is coupled to the end portion 321 of the sub-line 32; another triple-throw-side terminal is coupled to the end portion 322 of the sub-line 32; and the other triple-throw-side terminal is a floating terminal not coupled to anywhere.

For example, when a detected signal communicated from the end portion 322 side to the end portion 321 side of the sub-line 32 is outputted from the coupling terminal Pcp, the terminal coupled to the end portion 321 of the sub-line 32 is selected from the triple-throw-side terminals of the switch SW213, and the terminal coupled to the end portion 322 of the sub-line 32 is selected from the triple-throw-side terminals of the switch SW223. Of the switches SW91 and SW92, the switch SW91 is in the shorted state, and the switch SW92 is in the open state. Of each of the switches SW113 and SW123, the floating terminal is selected from the triple-throw-side terminals.

With this configuration, similarly to the directional coupler 10 according to the first embodiment, the directional coupler 10J can obtain a detected signal in a desired frequency band, while suppressing transfer loss of radio-frequency signals flowing through the main line 20 over a wide frequency band. For of the sub-lines 31 and 32, a sub-line not coupled to the coupling terminal Pcp and the termination circuit 80 (for example, the sub-line 31) is in the shorted state, the floating terminal of the switching circuit 41J is selected so that coupling the sub-line 31 to the sub-line 32 is avoided. This can reduce adverse effects caused when the sub-line 31 is coupled to the sub-line 32.

Twelfth Embodiment

Figure 29:
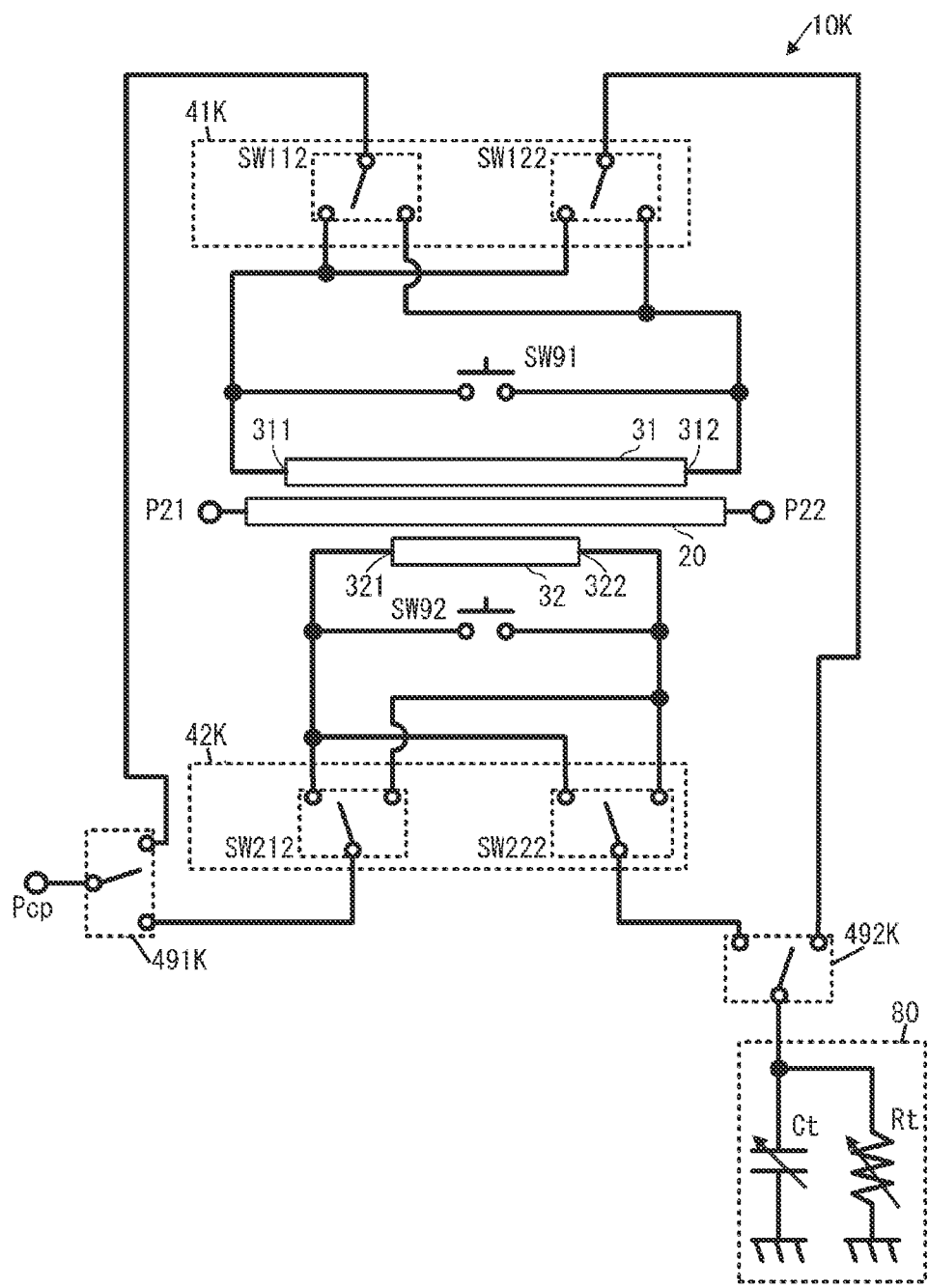
FIG. 29 is a configuration diagram of a directional coupler according to a twelfth embodiment.

A directional coupler according to a twelfth embodiment of the present invention will be described with reference to the drawings. FIG. 29 is a configuration diagram of the directional coupler according to the twelfth embodiment.

As illustrated in FIG. 29, a directional coupler 10K according to the twelfth embodiment differs from the directional coupler 10H according to the ninth embodiment in that SPDT switches are used. Other configurations of the directional coupler 10K are the same as the directional coupler 10H, and descriptions of the same configurations are not repeated.

The directional coupler 10K includes switching circuits 41K, 42K, 491K, and 492K.

The switching circuit 41K includes switches SW112 and SW122. The switches SW112 and SW122 are single-pole double-throw (SPDT) switch elements.

Of the switch SW112, a single-pole-side terminal is coupled to the switching circuit 491K; a double-throw-side terminal is coupled to the end portion 311 of the sub-line 31; and the other double-throw-side terminal is coupled to the end portion 312 of the sub-line 31. Of the switch SW122, a single-pole-side terminal is coupled to the switching circuit 492K; a double-throw-side terminal is coupled to the end portion 311 of the sub-line 31; and the other double-throw-side terminal is coupled to the end portion 312 of the sub-line 31.

The switching circuit 42K includes switches SW212 and SW222. The switches SW212 and SW222 are single-pole double-throw (SPDT) switch elements.

Of the switch SW212, a single-pole-side terminal is coupled to the switching circuit 491K; a double-throw-side terminal is coupled to the end portion 321 of the sub-line 32; and the other double-throw-side terminal is coupled to the end portion 322 of the sub-line 32. Of the switch SW222, a single-pole-side terminal is coupled to the switching circuit 492K; a double-throw-side terminal is coupled to the end portion 321 of the sub-line 32; and the other double-throw-side terminal is coupled to the end portion 322 of the sub-line 32.

The switching circuit 491K is a single-pole double-throw (SPDT) switch element. Of the switching circuit 491K, a single-pole-side terminal is coupled to the coupling terminal Pcp; a double-throw-side terminal is coupled to the switch SW112 of the switching circuit 41K; and the other double-throw-side terminal is coupled to the switch SW212 of the switching circuit 42K.

The switching circuit 492K is a single-pole double-throw (SPDT) switch element. In the switching circuit 492K, a single-pole-side terminal is coupled to the termination circuit 80; a double-throw-side terminal is coupled to the switch SW122 of the switching circuit 41K; and the other double-throw-side terminal is coupled to the switch SW222 of the switching circuit 42K With this configuration, similarly to the directional coupler 10H according to the ninth embodiment, the directional coupler 10K can obtain a detected signal in a desired frequency band, while suppressing transfer loss of radio-frequency signals flowing through the main line 20 over a wide frequency band.

As indicated in the directional couplers 10J and 10K, switching circuits are not limited to single-pole single-throw (SPST) switches; switching circuits are implemented by m-pole n-throw (mPnT: m and n are positive integers) switches.

Thirteenth Embodiment

Figure 30A:
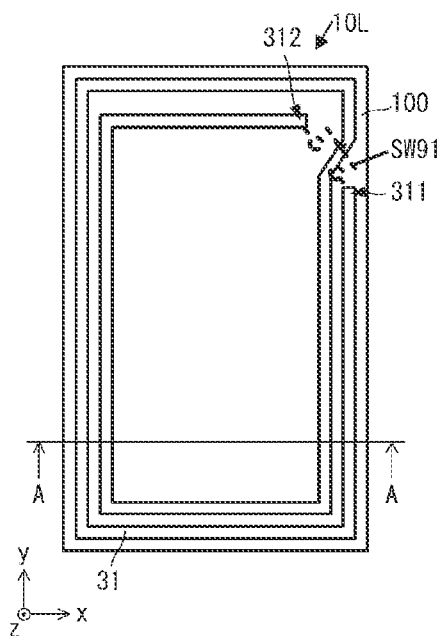
FIG. 30A is a plan view of a sub-line of a directional coupler according to a thirteenth embodiment.
Figure 30B:
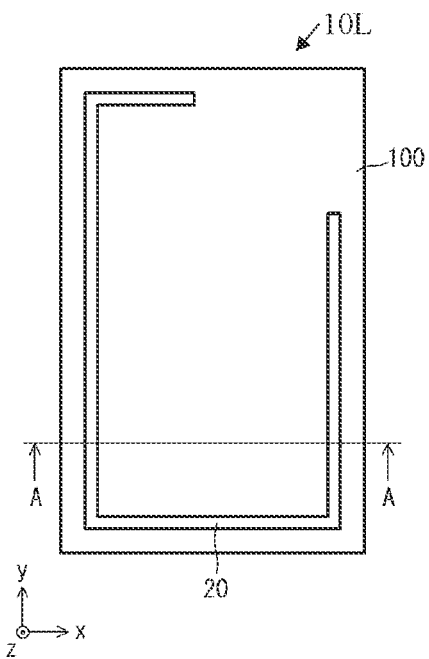
FIG. 30B is a plan view of a main line of the directional coupler according to the thirteenth embodiment.
Figure 30C:
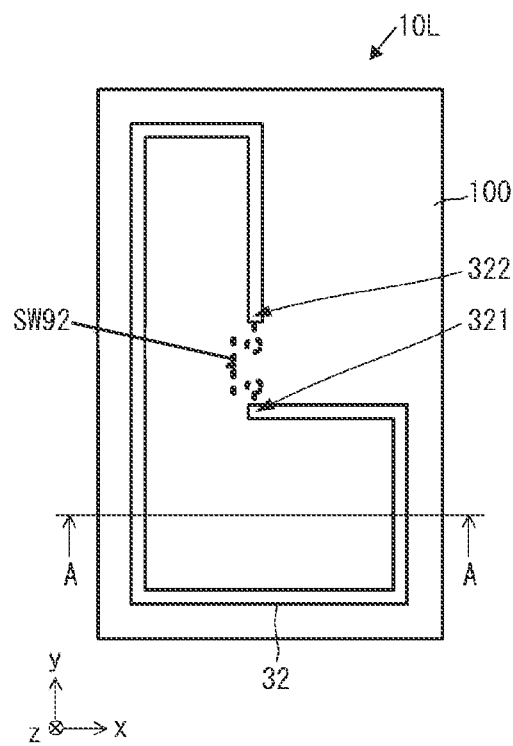
FIG. 30C is a plan view of a sub-line of the directional coupler according to the thirteenth embodiment.
Figure 31:
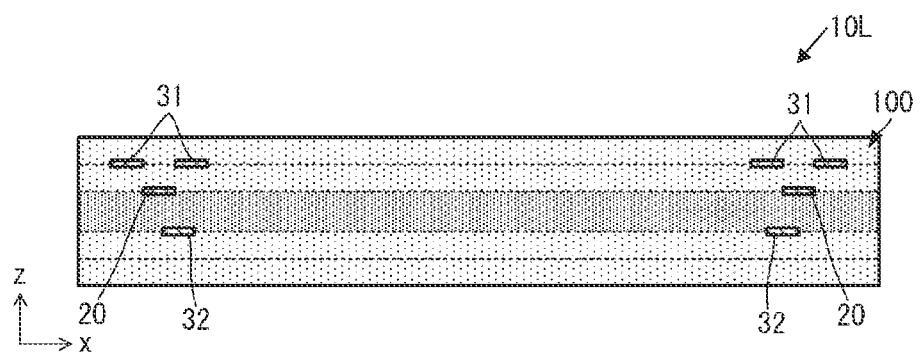
FIG. 31 is a sectional view schematically illustrating a structure of the directional coupler according to the thirteenth embodiment.

A directional coupler according to a thirteenth embodiment of the present invention will be described with reference to the drawings. FIGS. 30A, 30B, and 30C are plan views of a main line and sub-lines of a directional coupler according to the thirteenth embodiment. FIGS. 30A and 30C illustrate sub-lines, and FIG. 30B illustrates a main line. FIG. 31 is a sectional view schematically illustrating a structure of the directional coupler according to the thirteenth embodiment. FIG. 31 illustrates a section taken along line A-A in FIGS. 30A, 30B, and 30C.

A directional coupler 10L according to the thirteenth embodiment realizes one structure of the directional coupler 10 according to the first embodiment. The circuit configuration of the directional coupler 10L is the same as the circuit configuration of the directional coupler 10, and descriptions of the circuit configuration is omitted.

As illustrated in FIGS. 30A, 30B, 30C, and 31, the directional coupler 10L includes a multilayer body 100. The multilayer body 100 includes a plurality of insulator layers stacked. For example, the multilayer body 100 is formed by stacking a plurality of prepreg layers on both side of a core material layer.

As illustrated in FIG. 30B, the main line 20 is a conductor elongated in a particular shape. More specifically, the main line 20 is shaped as a loop with an almost single turn. A loop of the present invention is not necessarily a complete ring, and a loop has at least a portion of a ring.

As illustrated in FIG. 31, the sub-line 31 is disposed on one side with respect to the main line 20 in the thickness direction of the multilayer body 100. As illustrated in FIG. 30A, the sub-line 31 is a conductor elongated in a particular shape. More specifically, the sub-line 31 is shaped as a loop with almost two turns. The sub-line 31 is elongated parallel to the main line 20 for the almost entire length. As a result, the sub-line 31 can be electromagnetically coupled to the main line 20 to a particular degree of coupling.

As illustrated in FIG. 31, the sub-line 32 is disposed on the other side with respect to the main line 20 in the thickness direction of the multilayer body 100. As illustrated in FIG. 30C, the sub-line 32 is a conductor elongated in a particular shape. More specifically, the sub-line 32 is shaped as a loop with an almost single turn. The sub-line 32 is elongated parallel to the main line 20 for the almost entire length. As a result, the sub-line 32 can be electromagnetically coupled to the main line 20 to a particular degree of coupling.

The length of the loop of the sub-line 31 is longer than the length of the loop of the sub-line 32. As a result, the frequency band that can be coupled in the sub-line 31 is lower than the frequency band that can be coupled in the sub-line 32.

As illustrated in FIG. 30A, the end portions 311 and 312 of the sub-line 31 are close to each other. As used herein, the term "close" indicates, for example, the arrangement in which the distance between the end portions 311 and 312 is shorter than one shorter side determining the ring-like central open space formed by the sub-line 31 (the diameter when the ring-like shape is circular) as illustrated in FIG. 30A, and more preferably, the arrangement in which the distance between the end portions 311 and 312 is ½ of the one shorter side or shorter, or ¼ of the one shorter side or shorter.

With this structure, the connection distance between the end portions 311 and 312 and the switch SW91 is made short. As a result, when the switch SW91 is in the shorted state, the inductance in the path including the switch SW91 is low. This suppresses a decrease in how much the resonant frequency is shifted due to the effect of the switch SW91 in the shorted state. As such, the effect of the switch SW91 in the shorted state becomes more effective.

Similarly, as illustrated in FIG. 30C, the end portions 321 and 322 of the sub-line 32 are close to each other. As used herein, the term "close" indicates, for example, the arrangement in which the distance between the end portions 321 and 322 is shorter than one shorter side determining the ring-like central open space formed by the sub-line 32 (the diameter when the ring-like shape is circular) as illustrated in FIG. 30C, and more preferably, the arrangement in which the distance between the end portions 321 and 322 is ½ of the one shorter side or shorter, or ¼ of the one shorter side or shorter.

With this structure, the connection distance between the end portions 321 and 322 and the switch SW92 is made short. As a result, when the switch SW92 is in the shorted state, the inductance in the path including the switch SW92 is low. This suppresses a decrease in how much the resonant frequency is shifted due to the effect of the switch SW92 in the shorted state. As such, the effect of the switch SW92 in the shorted state becomes more effective.

This embodiment is not to be interpreted as limiting. The above describes a mode in which the switch SW91 (a switch for bringing a low-frequency-side sub-line in the shorted state) and the switch SW92 (a switch for bringing a high-frequency-side sub-line in the shorted state) are both provided, but it is sufficient that either the switch SW91 (a switch for bringing a low-frequency-side sub-line in the shorted state) or the switch SW92 (a switch for bringing a high-frequency-side sub-line in the shorted state) be provided. In this case, the higher the frequency band is, the more the effect on the attenuation pole is. For this reason, it is preferable that the directional coupler include at least the switch SW91 (a switch for bringing a low-frequency-side sub-line in the shorted state).

Fourteenth Embodiment

Figure 32:
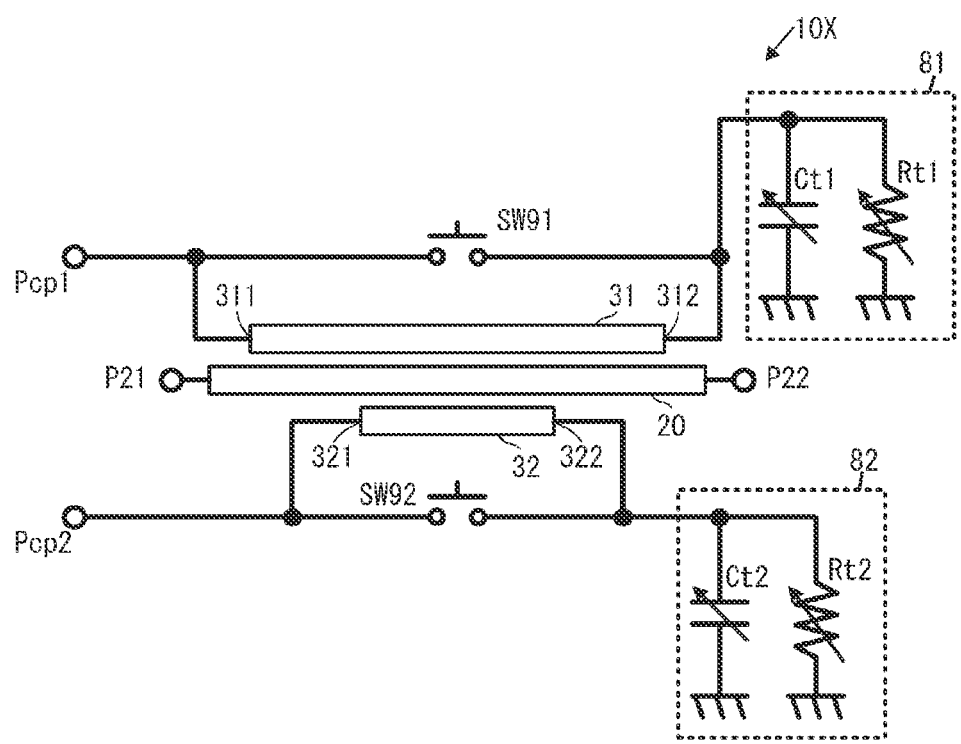
FIG. 32 is a configuration diagram of a directional coupler according to a fourteenth embodiment.

A directional coupler according to a fourteenth embodiment of the present invention will be described with reference to the drawings. FIG. 32 is a configuration diagram of the directional coupler according to the fourteenth embodiment.

A directional coupler 10X according to the fourteenth embodiment has a configuration in which the switching circuits 41 and 42 are removed from the directional coupler 10G according to the eighth embodiment. Other configurations of the directional coupler 10X are the same as the directional coupler 10G, and descriptions of the same configurations are not repeated.

In this configuration, although only coupling signals in one direction are obtained in the sub-lines 31 and 32, similarly to the directional coupler 10G according to the eighth embodiment, the directional coupler 10X can obtain a detected signal in a desired frequency band, while suppressing transfer loss of radio-frequency signals flowing through the main line 20 over a wide frequency band.

The configurations of the embodiments may be combined in any appropriate manner, and it is possible to achieve effects and advantages corresponding to individual combinations thereof.

REFERENCE SIGNS LIST 10, 10A, 10B, 10C, 10D, 10E, 10F, 10G, 10H, 10I, 10J, 10K, 10L, 10X directional coupler
20 main line
31, 32, 33 sub-line
41, 42, 41A, 42A, 41B, 42B, 41C, 42C, 41D, 42D, 41E, 42E, 41F, 42F, 41H, 42H, 41J, 42J, 41K, 42K, 43, 491, 492, 491K, 492K switching circuit
80, 81, 82 termination circuit
100 multilayer body
311, 312, 321, 322, 331, 332 end portion
P21, P22 input-output terminal Pcp, Pcp1, Pcp2 coupling terminal
SW11-SW14, SW21-SW24, SW31-SW34, SW112, SW113, SW122, SW123, SW212, SW213, SW222, SW223, SW91, SW92, SW93 switch

The invention claimed is:

1. A directional coupler comprising:
a main line;
a first sub-line and a second sub-line that are electromagnetically coupled to the main line; and
a first switching circuit coupled in parallel between a first end and a second end of the first sub-line, the first switching circuit being configured to switch connection of the first end and the second end between a shorted state and an open state.

2. The directional coupler according to claim 1, further comprising:
a coupling terminal and a termination circuit that are coupled to the first sub-line and to the second sub-line; and
a second switching circuit is configured to couple the first sub-line and the second sub-line to the coupling terminal and the termination circuit.

3. The directional coupler according to claim 2, wherein the second switching circuit is configured to switch the first sub-line and the second sub-line such as to couple either the first sub-line or the second sub-line to the coupling terminal and to the termination circuit.

4. The directional coupler according to claim 3, wherein the first switching circuit is configured to, when the second switching circuit couples the second sub-line to the coupling terminal and the termination circuit, switch connection of the first end and the second end of the first sub-line to the shorted state.

5. The directional coupler according to claim 3, wherein the first switching circuit is configured to, when the second switching circuit couples the first sub-line to the coupling terminal and the termination circuit, switch connection of the first end and the second end of the first sub-line to the open state.

6. The directional coupler according to claim 2,
wherein the second switching circuit has:
    a first connection mode in which the first end of the second sub-line is coupled to the coupling terminal, and the second end of the second sub-line is coupled to the termination circuit, and
    a second connection mode in which the second end of the second sub-line is coupled to the coupling terminal, and the first end of the second sub-line is coupled to the termination circuit, and
wherein the second switching circuit is configured to switch between the first connection mode and the second connection mode.

7. The directional coupler according to claim 2, further comprising:
    a first switch coupled between the first end of the first sub-line and the coupling terminal,
    a second switch coupled between the second end of the first sub-line and the coupling terminal,
    a third switch coupled between the first end of the first sub-line and the termination circuit, and
    a fourth switch coupled between the second end of the first sub-line and the termination circuit,
wherein the second switching circuit comprises a sixth switch configured to switch connection of the third switch and fourth switch between the shorted state and the open state.

8. The directional coupler according to claim 7,
wherein the second switching circuit has a third connection mode in which the first end and the second end of the first sub-line is coupled to each other,
wherein the sixth switch is configured to, when the third connection mode is achieved by the third switch and the fourth switch, switch connection of the third switch and the fourth switch to the open state.

9. The directional coupler according to claim 7, wherein the sixth switch is configured to, when the second connection mode is achieved by the second switch and the third switch, switch connection of the third switch and the coupling terminal to the shorted state.

10. The directional coupler according to claim 2, further comprising:
    a first switch coupled between the first end of the first sub-line and the coupling terminal,
    a second switch coupled between the second end of the first sub-line and the coupling terminal,
    a third switch coupled between the first end of the first sub-line and the termination circuit, and
    a fourth switch coupled between the second end of the first sub-line and the termination circuit,
wherein the second switching circuit comprises a fifth switch configured to switch connection of the first switch and the second switch between a shorted state and an open state.

11. The directional coupler according to claim 10,
wherein the second switching circuit has a third connection mode in which the first end and the second end of the first sub-line is coupled to each other,
wherein the fifth switch is configured to, when the third connection mode is achieved by the first switch and the second switch, switch connection of the first switch and the second switch, and the coupling terminal, to the open state.

12. The directional coupler according to claim 10, wherein the fifth switch is configured to, when the first connection mode is achieved by the first switch and the fourth switch, switch connection of the first switch and the coupling terminal to the shorted state.

* * * * *

UNITED STATES PATENT AND TRADEMARK OFFICE
CERTIFICATE OF CORRECTION

| | |
|---|---|
| PATENT NO. | : 12,451,581 B2 |
| APPLICATION NO. | : 18/168644 |
| DATED | : October 21, 2025 |
| INVENTOR(S) | : Tokuda et al. |

Page 1 of 1

It is certified that error appears in the above-identified patent and that said Letters Patent is hereby corrected as shown below:

In the Specification

Column 4, Line 46, "sub-line and or a detected" should be --sub-line or a detected--

Column 23, Line 22, "coupling terminal Pcp2" should be --coupling terminal Pcp1--

Column 23, Line 23, "circuit 42E" should be --circuit 41E--

Column 23, Line 23, "coupling terminal Pcp2" should be --coupling terminal Pcp1--

Column 23, Line 24, "switches SW21 and SW22" should be --switches SW11 and SW12--

Column 23, Line 27, "switches SW21 and W22" should be --switches SW21 and SW22--

Signed and Sealed this
Tenth Day of February, 2026

John A. Squires
*Director of the United States Patent and Trademark Office*